United States Patent
Kazemi

(10) Patent No.: US 7,007,038 B1
(45) Date of Patent: Feb. 28, 2006

(54) DEFECT MANAGEMENT DATABASE FOR MANAGING MANUFACTURING QUALITY INFORMATION

(75) Inventor: Niakam Kazemi, Dayton, MD (US)

(73) Assignee: CIENA Corporation, Linthicum, MD (US)

(*) Notice: Subject to any disclaimer, the term of this patent is extended or adjusted under 35 U.S.C. 154(b) by 210 days.

(21) Appl. No.: 09/828,351

(22) Filed: Apr. 6, 2001

(51) Int. Cl.
*G06F 17/30* (2006.01)

(52) U.S. Cl. .............................. 707/200; 707/3; 707/10

(58) Field of Classification Search ................ 707/1–3, 707/100, 10, 102, 200; 702/182, 188; 700/108, 700/174, 109, 110
See application file for complete search history.

(56) References Cited

U.S. PATENT DOCUMENTS

| | | | | |
|---|---|---|---|---|
| 6,161,101 A | * | 12/2000 | Guinta et al. .................. | 706/45 |
| 6,167,401 A | * | 12/2000 | Csipkes et al. ................ | 707/10 |
| 6,381,556 B1 | * | 4/2002 | Kazemi et al. ............. | 702/182 |
| 6,611,728 B1 | * | 8/2003 | Morioka et al. ............ | 700/109 |
| 6,744,266 B1 | * | 6/2004 | Dor et al. .................... | 324/751 |
| 6,801,822 B1 | * | 10/2004 | Fujiwara et al. ............ | 700/108 |

* cited by examiner

*Primary Examiner*—Cam-Y Truong
(74) *Attorney, Agent, or Firm*—Dougherty Clements; Christopher L. Bernard; Tyler S. Brown

(57) ABSTRACT

A manufacturing quality information database structure is useful for tracking quality information relating to a manufacturing process. Accurate tracking of symptoms, defects, and actions (repairs) is achieved through data associations between symptom data entities, defect data entities, and action data entities. Further associations between symptom and symptom category data entities; defect and defect category data entities; and action and action category data entities may be used to increase the data tracking capabilities of the database. Moreover, manufacturing processes and process steps may be tracked by process and process step data entities that may also be associated with the symptom, defect and action data entities. Still further, a variety of different modules and module types may be tracked by including an item data entity that identifies each module.

22 Claims, 18 Drawing Sheets

Troubleshooting Guide

The following is a list of the most likely causes for the specified SYMPTOM

| Defect Category | Defect | Frequency |
|---|---|---|
| Component Defects | Defective Component | 58 |
| Testing Defects | Test Error | 51 |
| Component Defects | Damaged | 26 |
| Fiber Defects | Broken Fiber | 11 |
| Connector Defects | Pitted | 10 |
| Solder Defects | Insufficient Solder | 8 |
| Testing Defects | High Insertion loss | 6 |
| Solder Defects | Excessive Solder | 5 |
| Testing Defects | Proof Test Break | 5 |
| Component Defects | Wrong Component | 5 |

Figure 15

DEFECT MANAGEMENT DATABASE FOR MANAGING MANUFACTURING QUALITY INFORMATION

BACKGROUND OF THE INVENTION

1. Field of Invention

The invention relates to a system, database structure and method for managing defect information related to manufactured or assembled products which are generally referred to herein as "modules." The invention also relates to a method and system for improving the quality of manufactured modules.

2. Description of Related Art

Optical communications component and systems manufacturing is a demanding environment that requires very high quality and defect free products. To that end, the manufactured or assembled components and systems are subjected to rigorous testing and inspection before shipment to a customer.

The manufacture of optical communications components and systems, like some other manufacturing environments, relies upon manual or semi-automated processes in which human personnel are involved during the assembly, testing, repair, and inspection phases of production. The human element permits defects and defect symptoms to be observed by a variety of personnel such as the assembly operator, troubleshooter, repairperson (reworker) and inspector. However, there is no systematic coordination of the various information generated during observations, tests, repairing and inspections conducted by these different personnel.

Some of the manufacturing processes may also be automated such as automated or semi-automated component placement, testing, and inspection. The machines involved in this automation may also gather symptom or defect information. Coordinating and sharing this automatically or semi-automatically generated symptom and defect data with the various stages of manufacturing would also improve the process and lead to a higher-quality product.

SUMMARY OF THE INVENTION

The inventive manufacturing quality information database may be stored in a computer-readable medium and is usable for tracking quality information relating to a manufacturing process. The manufacturing quality information database includes: a symptom data entity storing symptoms of manufacturing process defects; a defect data entity storing defects of the manufacturing process; and an action data entity storing repair actions for remedying related defects, the defect data entity being associated with the symptom data entity; and the action data entity being associated with the defect data entity.

The manufacturing quality information database may also track a plurality of manufacturing processes. In that case, the manufacturing quality information database further includes: a process data entity storing identities of the manufacturing processes and wherein the symptom data entity, the defect data entity, and the action data entity are associated with the process data entity.

The manufacturing quality information database may also track a plurality of manufactured items. In that case, the manufacturing quality information database further includes an item data entity storing identities of manufactured item and wherein the symptom data entity, the defect data entity, and the action data entity are associated with the item data entity.

The manufacturing quality information database may also include: a symptom category data entity for storing symptom categories of manufacturing defects; the symptom data entity being associated with the symptom category data entity.

In the case that the manufacturing quality information database tracks a plurality of manufacturing processes, the manufacturing quality information database may further include a process data entity storing identities of the manufacturing processes and a process/symptom frequency data entity observing a relationship frequency between the symptom categories and the manufacturing process identities.

The manufacturing quality information database may also include a defect category data entity for storing defect categories of the manufacturing process wherein the defect data entity is associated with the defect category data entity. The database may further include a symptom/defect frequency data entity observing a relationship frequency between the symptom categories and the defect categories.

The manufacturing quality information database may also include an action category data entity storing action categories wherein the action data entity is associated with the action category data entity. The database may further include a defect/action frequency data entity observing a relationship frequency between the defect categories and the action categories.

In the case that the manufacturing quality information database tracks a plurality of manufacturing processes, the database may further include a process data entity storing identities of the manufacturing processes, a symptom category data entity storing symptom categories of manufacturing defects; a defect category data entity storing defect categories of the manufacturing process; and a process/symptom/defect frequency data entity observing a relationship frequency between the manufacturing process identities, the symptom categories and the defect categories.

In the case that the manufacturing quality information database tracks a plurality of manufacturing processes, the database may also include a process data entity storing identities of the manufacturing processes, a symptom category data entity storing symptom categories of manufacturing defects; a defect category data entity storing defect categories of the manufacturing process; an action category data entity storing action categories; and a process/symptom/defect/action frequency data entity observing a relationship frequency between the manufacturing process identities, the symptom categories, the defect categories, and the action categories.

The manufacturing quality information database may also include a symptom category data entity storing symptom categories of manufacturing defects; a defect category data entity storing defect categories of the manufacturing process; the symptom data entity being associated with the symptom category data entity; the defect data entity being associated with the defect category data entity; and the defect category entity being associated with the symptom category data entity.

The manufacturing quality information database may also include a defect category data entity storing defect categories of the manufacturing process; an action category data entity storing action categories; the defect data entity being associated with the defect category data entity; the action data entity being associated with the action category data entity; and the action category data entity being associated with the defect category data entity.

Another aspect of the invention includes a method of using a manufacturing quality information database for tracking quality information relating to a manufacturing process, including: storing symptoms of manufacturing process defects in a symptom data entity; storing defects of the manufacturing process in a defect data entity; and storing repair actions for remedying related defects in an action data entity, associating the defect data entity with the symptom data entity; and associating the action data entity with the defect data entity.

The method of the invention may also include tracking a plurality of manufacturing processes with the manufacturing quality information database; storing identities of the manufacturing processes in a process data entity; and associating the symptom data entity, the defect data entity, and the action data entity with the process data entity.

The method of the invention may further include tracking a plurality of manufactured items with the manufacturing quality information database; storing identities of manufactured items in an item data entity; and associating the symptom data entity, the defect data entity, and the action data entity with the item data entity.

The method may still further include storing symptom categories of manufacturing defects in a symptom category data entity; and associating the symptom data entity with the symptom category data entity.

The method may further include tracking a plurality of manufacturing processes with the manufacturing quality information database; storing identities of the manufacturing processes in a process data entity; observing a relationship frequency between the symptom categories and the manufacturing process; and storing the relationship frequency in a process/symptom frequency data entity.

The method may still further include storing defect categories of the manufacturing process in a defect category data entity; and associating the defect data entity being with the defect category data entity.

The method may also include observing a relationship frequency between the symptom categories and the defect categories; and storing the relationship frequency in a symptom/defect frequency data entity.

The method may further include storing action categories in an action category data entity; and associating the action data entity with the action category data entity.

The method may further include observing a relationship frequency between the defect categories and the action categories; and storing the relationship frequency in a defect/action frequency data entity.

The method may further include tracking a plurality of manufacturing processes with the manufacturing quality information database; storing identities of the manufacturing processes in a process data entity; storing symptom categories of manufacturing defects in a symptom category data entity; storing defect categories of the manufacturing process in a defect category data entity; observing a relationship frequency between the manufacturing process identities, the symptom categories and the defect categories; and storing the relationship frequency in a process/symptom/defect frequency data entity.

The method may further include tracking a plurality of manufacturing processes with the manufacturing quality information database, storing identities of the manufacturing processes in a process data entity, storing symptom categories of manufacturing defects in a symptom category data entity; storing defect categories of the manufacturing process in a defect category data entity; storing action categories in an action category data entity; observing a relationship frequency between the manufacturing process identities, the symptom categories, the defect categories, and the action categories; and storing the relationship frequency in a process/symptom/defect/action frequency data entity.

The method may further include storing symptom categories of manufacturing defects in a symptom category data entity; storing defect categories of the manufacturing process in a defect category data entity; associating the symptom data entity with the symptom category data entity; associating the defect data entity with the defect category data entity; and associating the defect category entity with the symptom category data entity.

The method may still further include storing defect categories of the manufacturing process in a defect category data entity; storing action categories in an action category data entity; associating the defect data entity with the defect category data entity; associating the action data entity with the action category data entity; and associating the action category data entity with the defect category data entity.

The inventive methods may also use any of the other data entities or relationships describe above include.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein:

FIG. 10b is an alternative graphical user interface according to the invention that is intended for a troubleshooter working in a manufacturing plant to log defects for associated modules;

FIG. 11b is an alternative graphical user interface according to the invention that is intended for a reworker working in a manufacturing plant to view logged symptoms and defects as well as log corrective actions taken for associated modules;

FIG. 15 is a graphical user interface according to the invention illustrating various aspects of the troubleshooting guide.

DETAILED DESCRIPTION OF INVENTION

The following detailed description of the invention refers to the accompanying drawings. The same reference numbers in different drawings identify the same or similar elements. Also, the following detailed description does not limit the invention. Instead, the scope of the invention is defined by the appended claims and equivalents thereof.

The expression "optically communicates" as used herein refers to any connection, coupling, link or the like by which optical signals carried by one optical system element are imparted to the "communicating" element. Such "optically communicating" devices are not necessarily directly connected to one another and may be separated by intermediate optical components or devices. Likewise, the expressions "connection" and "operative connection" as used herein are relative terms and do not require a direct physical connection.

Figure 1:
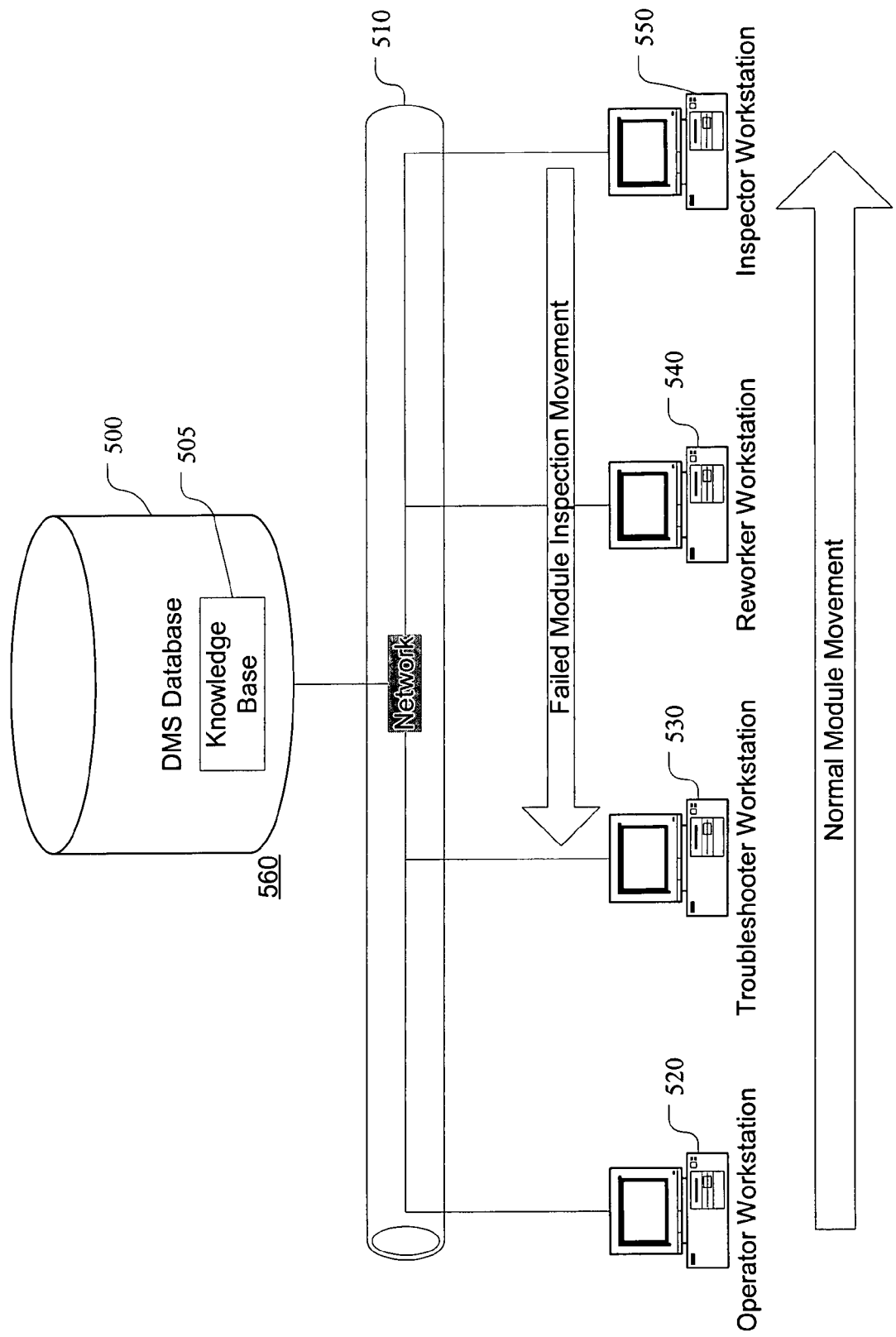
FIG. 1 is a simplified system block diagram according to the invention for performing defect management.

FIG. 1 illustrates DMS (defect management system) 560 which includes a network 510 operatively connecting a DMS database 500 to workstations 520, 530, 540, and 550.

The DMS database 500 may be implemented with any known or future-developed database management systems that preferably support SQL or its equivalent such as MS-SQL or Oracle and may be hosted by an appropriate server or group of servers (not shown). The network 510 may be constructed with conventional technology including, for example, Ethernet.

The workstations of the DMS system 560 include an operator workstation 520, a troubleshooter workstation 530, a reworker workstation 540, and an inspector workstation 550. Each of the workstations 520, 530, 540, and 550 may be constructed with conventional computer equipment and preferably includes a display device, processor, and input device to enable human interaction with the DMS system 560.

Each of the workstations 520, 530, 540, and 550 is also programmed with a defect information management application program the functions of which will be explained in detail below in relation to FIGS. 3–13.

While the preferred arrangement of system includes a workstation for each of the human roles (operator, troubleshooter, reworker, and inspector) it is possible to have a single multi-user workstation. Providing a workstation for each of the human roles is generally preferred because each of the human users typically work in physically distinct locations and perform different roles such that sharing a workstation would be impractical or inefficient.

As further explained below, DMS 560 includes a multi-user client-server application (the defect information management application) programmed into each of the workstations 520, 530, 540 and 550 and which complements MCS (manufacturing control system as described in U.S. Pat. Nos. 6,188,402 and 6,167,401 the contents of which are hereby incorporated by reference).

The DMS 560 allows the human operators to log and manage all aspects of defective modules. For example and as further explained below, the DMS 560 is used to track any defective module from the moment the defect symptom is noticed, through troubleshooting, repair and final inspection of the repair.

FIG. 1 also generally illustrates the normal module movement from workstation to workstation as well as failed module inspection movement. The normal module movement is from the operator workstation 520 manned by an operator who may notice symptoms of a defect; to a troubleshooter workstation 530 manned by a troubleshooter who may diagnose any defects present and make repair suggestions; to a reworker workstation 540 manned by a repair-person who may repair defects; and then to an inspector workstation 550 manned by an inspector who may inspect whether the repair has been successful or otherwise make a determination that the module is defect free or not. If the inspector finds a defect, then the module may be sent back to the troubleshooter (or directly to the reworker).

Figure 2:
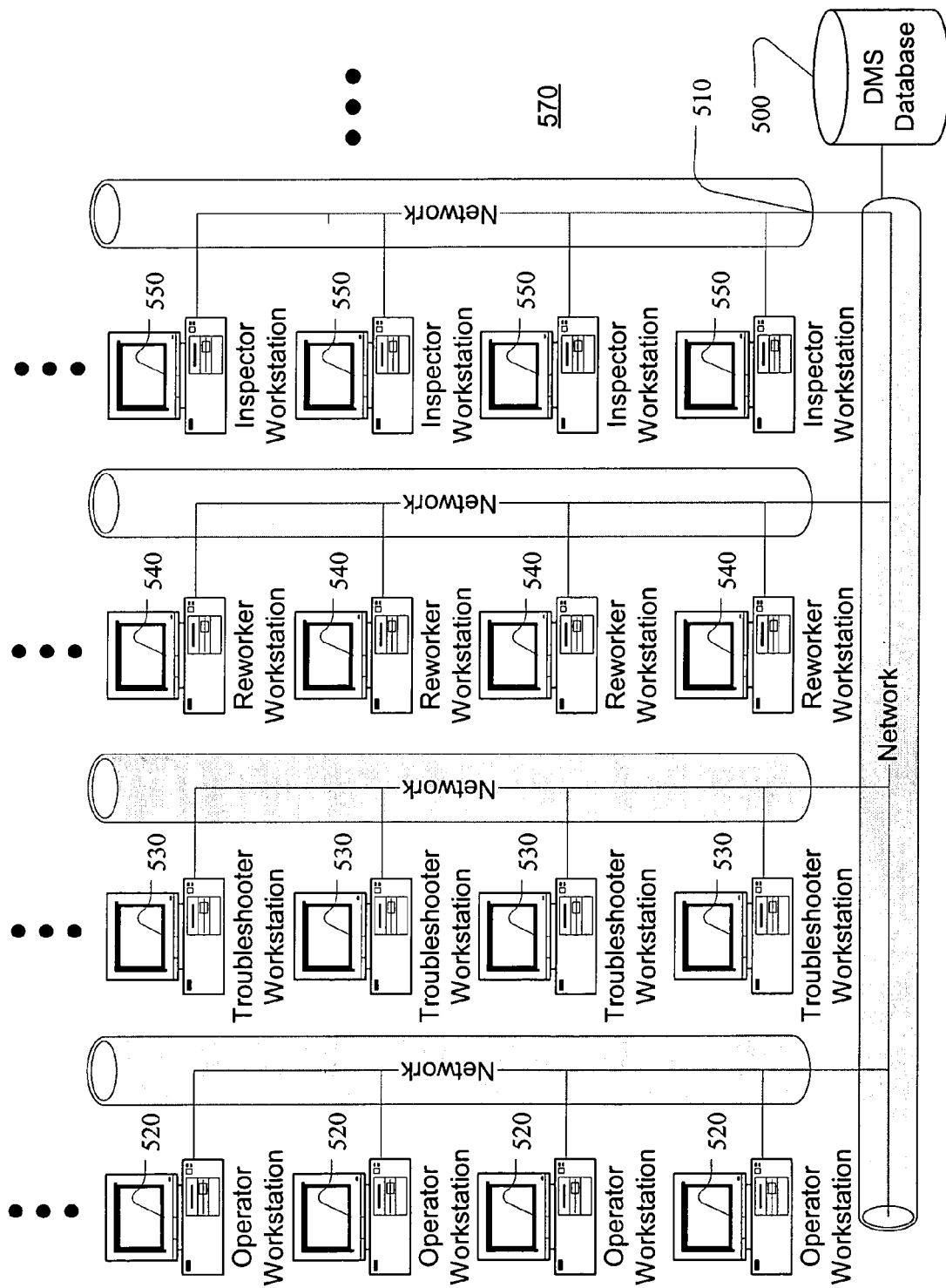
FIG. 2 is an expanded system block diagram according to the invention for performing defect management.

FIG. 2 illustrates a large defect management system 570 according to the invention. Such a large DMS 570 is intended for an entire manufacturing facility or at least a portion thereof that includes a plurality of human operators, troubleshooters, reworkers, and inspectors. In the DMS 570, the network 510 interconnects DMS database 500 to a plurality of operator workstations 520, a plurality of troubleshooter workstations 530, a plurality of reworker workstations 540, and plurality of inspector workstations 550.

As briefly mentioned above, the defect management systems 560, 570 may be used to manage a process generally composed of four steps which are as follows: (1) observe and log symptom(s) of the defective modules into the system database; (2) troubleshoot and log the defect(s) found along with repair suggestions; (3) repair the defect(s) and log the repair action(s) taken; and (4) inspect the module and confirm whether or not the module is fixed. Each step of this process is identified by a unique and corresponding user role including the operator, the troubleshooter, the reworker and the inspector. These users may generally function as follows:

The DMS operator observes and logs defect symptoms in order to generate a quality ticket 710, using the module serial number for identification and tracking purposes. The DMS 560, 570 may provide organized and easy to use combo boxes filled with preconfigured values in order to facilitate the logging process as further explained below in relation to FIGS. 6–13.

The DMS troubleshooter troubleshoots and logs the defect and the defect category using the module serial number and quality ticket 710 number. The DMS 560, 570 may provide organized and easy to use combo boxes filled with preconfigured values in order to facilitate the logging process as further explained below in relation to FIGS. 6–13. The logged defect information may also include a repair suggestion for the DMS reworker.

The DMS reworker repairs and logs the repair action and the repair action category using the module serial number and the quality ticket number. Again, the DMS 560, 570 may provide organized and easy to use combo boxes filled with preconfigured values in order to facilitate the logging process.

The DMS inspector inspects to confirm weather or not the defect is fixed using the module serial number and the quality ticket number in order to close the quality ticket. The DMS 560, 570 provides organized and easy to use interface in order to facilitate the inspection process.

Figure 3:
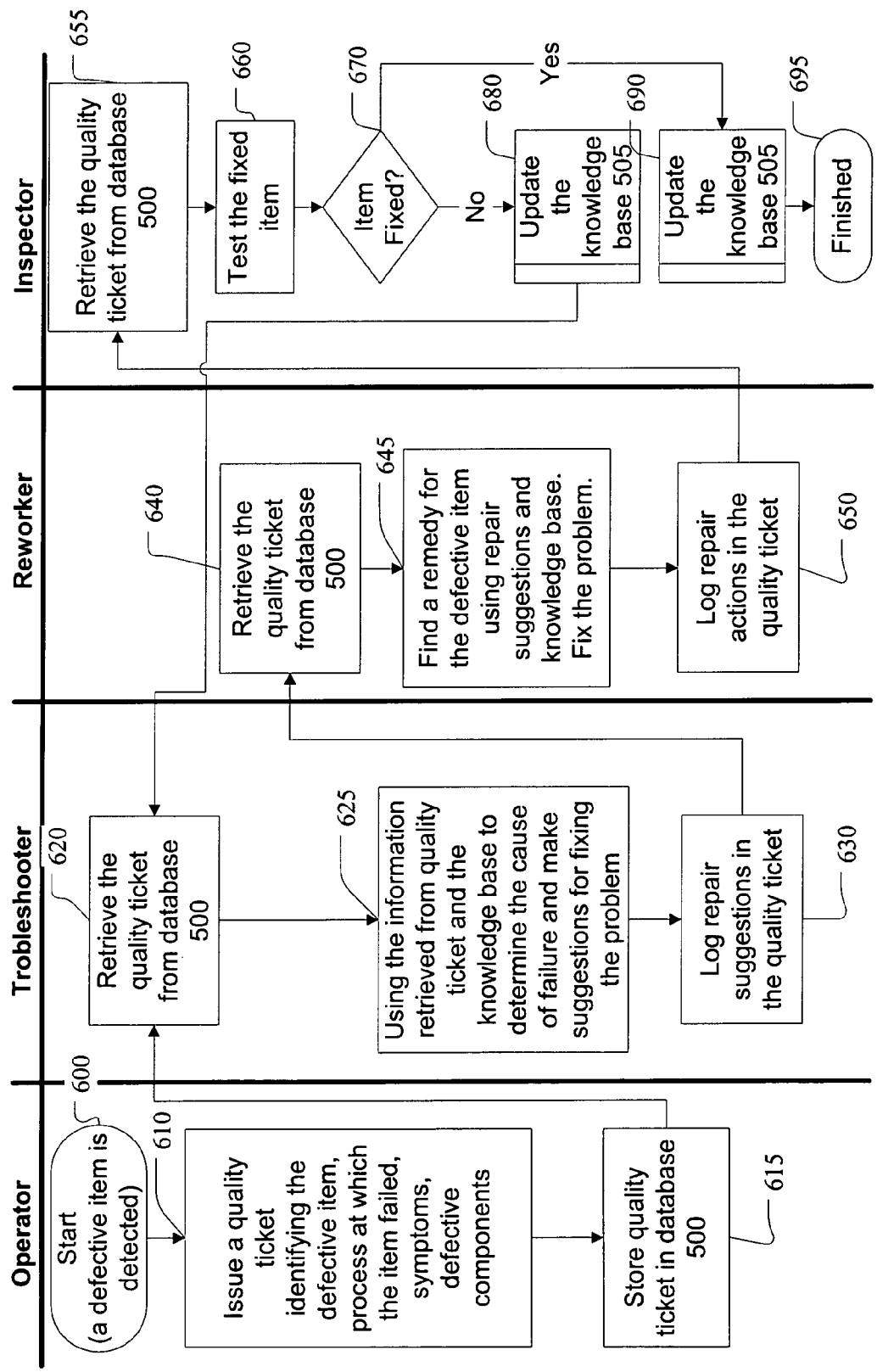
FIG. 3 is a high level flowchart illustrating a defect management process and workflow according to the invention.

FIG. 3 shows the defect management process and workflow in more detail. The division of labor between the operator, troubleshooter, reworker and inspector is delineated by bold columns. Starting with the operator who may be manufacturing, assembling and/or testing a module, the process starts 600 with the operator detecting a defective item (e.g. module, module component, function, system, etc). Upon detecting a defective item, the operator then issues 610 a quality ticket identifying the defective item and the defect symptom.

To increase the accuracy of the initial defect symptom detection, the operator may also identify the process associated with the detected symptom when issuing 610 the quality ticket. To further increase the accuracy, the operator may further identify the process step in addition to the process associated with the detected symptom. In other words, some manufacturing, assembly or testing functions include a multiplicity of processes (e.g. assemble, splice, solder, test). Furthermore, some processes include a multiplicity of process steps (e.g. an optical fiber splicing process may involve stripping, cleaning, fusing and recoating steps).

The preferred embodiment of the invention associates the detected defect symptom with a particular process and process step. This association has proven quite helpful in increasing the quality of the finished module as well as the accuracy of the DMS 560, 570 defect tracking.

The preferred embodiment also associates symptom categories, defect categories and defects with a particular process and process step. Such a level of granularity and association is an extremely powerful tool for improving the quality of manufactured modules.

The quality ticket issued by the operator is then stored 615 in the DMS database 500. For example, the operator workstation 520 may store the quality ticket information in the DMS database 500 via network 510.

As further shown in FIG. 3, the troubleshooter retrieves 620 the quality ticket from the DMS database 500. For example, the troubleshooter workstation 530 may retrieve the quality ticket information from the DMS database 500 via network 510.

The troubleshooter may then use 625 the quality ticket information (e.g. the detected symptoms and associated process and process step) retrieved from the DMS database 500 to determine the cause of the defect and make repair suggestions for fixing the problem. Such troubleshooting may include using test equipment to verify the cause of the detected symptom or otherwise perform a diagnosis.

In addition to the quality ticket information retrieved from the DMS database 500, the troubleshooter may also use 625 a knowledge base 505 to help determine the cause of the detected symptom or to detect other defects. The knowledge base 505 may be part of the DMS database 500 as shown in FIG. 1 and includes data relationships that relate symptoms (and symptom categories) to defects for each module type (e.g. part number, revision), process and process step. The quality ticket identifies the module, typically by serial number, module type, process and process step and further includes the detected symptom(s). Based on these data items, the knowledge base 505 presents the troubleshooter with a list of potential defects from which the troubleshooter may determine the actual defect.

The knowledge base 505 is not restricted to the above example and may be used to diagnose the fault in the module in many different ways per troubleshooters (and/or reworkers) requirements. In other words it can be customized per their needs. For example, The DMS system 560, 570 can provide the troubleshooter with a list of all the repair actions that fixed a certain symptom. This list can further contain the frequency of each action. This basically determines which action has been the most effective one in resolving the observed symptom. The DMS system 560, 570 can further determine what defects were related to a given action (this is what a troubleshooter wants to know when determining what the cause of a failure is.)

After the troubleshooter determines what the cause of a certain failure in the module is (determining what the defect is), the troubleshooter can command the DMS system 560, 570 and knowledge base 505 to provide him with a list of most effective actions to fix the defect. For example, the DMS system 560, 570 could retrieve the historical information from the knowledge base 505 and summarize them based on frequency of the taken actions to resolve the problem with the module. The knowledge base 505 can also suggest whether a given course of action, which the reworker might have in mind for fixing the problem, has ever fixed the problem and if so what percentage of the time. FIG. 15 is an example of a graphical user interface generated by the knowledge base 505 as will be further explained below.

After diagnosing the defect preferably with the aid of the knowledge bases 505, the troubleshooter may then make suggestions for fixing the defect. Specifically, the repair suggestions are logged 630 in the quality ticket and stored in the DMS database 500 via network 510.

As further shown in FIG. 3, the reworker retrieves the quality ticket from the DMS database 500 via network 510. The reworker may then use the information logged into the quality ticket (e.g. symptoms, defects, and repair suggestions) to remedy the defective item. The reworker may also utilize the knowledge base 505 to aid in the determination of how the defect should be repaired.

After repairing the defect, the reworker logs 650 repair actions (e.g. actions taken to correct or repair the defect). Specifically, the repair actions are logged 650 in the quality ticket and stored in the DMS database 500 via network 510.

The workflow then proceeds to the inspector who retrieves 655 the quality ticket from the DMS database 500 via network 510. The inspector may then use the information logged into the quality ticket (e.g. symptoms, defects, repair suggestions, and repair actions) to zero in on what should be tested.

As further shown in FIG. 3, the inspector tests 660 the repaired item. These tests may be performed using any known or conventional test technique such as visual inspection, electrical testing, optical testing, mechanical testing either aided by test equipment or otherwise. A decision 670 is then made as to whether the item has been fixed. This decision 670 is based upon the test results and may be made by the inspector or by the inspector workstation 550 comparing test results to standard or expected test results.

If the item has not been fixed, then the knowledge base 505 is updated 680. The knowledge base 505 is also updated 690 if the item has been fixed. The knowledge base 505 updates 680, 690 are intended as a feedback mechanism to increase the accuracy of troubleshooting and reworking which access the knowledge base 505 to determine the cause of the defects and to repair defects. If not fixed, this feedback is negative indicating that the troubleshooter diagnosis and/or repair action was not successful. If fixed, then the feedback is positive to reinforce the successful troubleshooting and/or repair action.

After updating 680 the knowledge base 505 following a determination 670 that the item has not been fixed, the workflow goes back to the troubleshooter. In other words, a defect is still present or a new defect has been noticed in the testing 660 of the item such that further troubleshooting and repair is necessary. FIG. 3 indicates this workflow.

On the other hand, if the item has been fixed then the process is finished 695 following the knowledge base 505 update 690.

Figure 4:
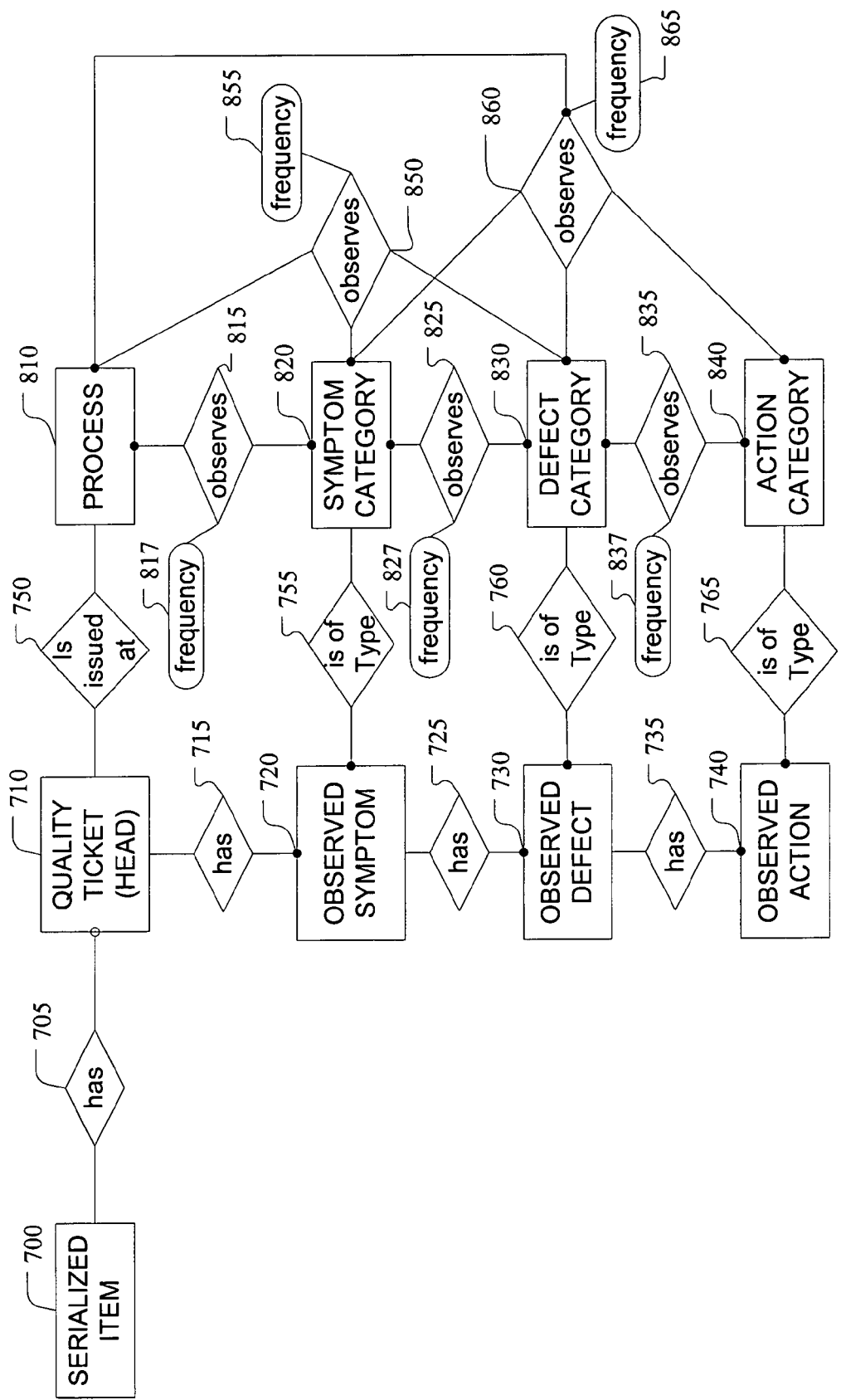
FIG. 4 is a high level entity relationship diagram illustrating data relationships of the inventive database.

FIG. 4 illustrates aspects of DMS database 500 in the form of a high level entity relationship diagram. Reading from left to right, the entity relationship includes a serialized item 700 which is representation of the module identified by serial number and serves as a key for all the data associated with the identified module. The serialized item 700 may also represent, for example, a module component or system of modules.

The serialized item 700 has associated therewith 705 a quality ticket 710. Generation of the quality ticket 710 is discussed above and examples of graphical user interfaces that are used to generated quality tickets 710 are shown in FIGS. 6–13.

Each quality ticket 710 has associated therewith 715 an observed symptom 720 which is a data item intended for the operator who observes symptoms. Logged symptoms are stored in the observed symptom 720. Moreover, each symptom 720 has an associated (is of type 755) symptom category 820.

Each observed symptom 720 also has associated therewith 725 an observed defect 730. The observed defect 730 data item is intended for the troubleshooter (or perhaps the inspector) who detects a defect and logs the observed defect information to the DMS database 500 which is stored in the observed defect 730 data item. Moreover, each observed defect 730 has an associated (is of type 760) defect category 830.

Furthermore, each observed defect has associated therewith 735 an observed action 740. The observed action 740 data item is intended for a reworker who decides which repair action should be taken and logs the repair action to the DMS database 500 which is stored in the observed action 740 data item. Moreover, each observed action 740 has an associated (is of type 765) action category 840.

Other important data relationships associate processes to symptoms; symptoms to defects; and defects to actions. More specifically and as shown in FIG. 4, each symptom category 820 is associated with a process 810. In this way, the DMS database 500 can track or observe 815 the relationship of symptom categories 820 to the process 810 in which the symptom was observed. This concept may also be extended to distinguish between processes and process steps such that symptom categories may be associated not only with macro processes but also with process steps. The observation 815 of the relation between the process 810 and the symptom category 820 is also used to generate a frequency 817 data item (process/symptom frequency data entity) which tracks how frequent symptoms categories 820 arise for a particular process and vice versa.

Furthermore, the symptom category 820 is associated with the defect category 830. In this way, the database can track or observe 825 the relationship of symptom categories 820 to defect categories 830. Such observations 825 are quite helpful in building the knowledge base 505 as it permits one to view just how the symptoms 820 and defects 830 relate to one another as well as determining the operators' success rate in correctly diagnosing symptoms. The observation 825 of the relation between the symptom category 820 and defect category 830 is also used to generate a frequency 827 data item (symptom/defect frequency data entity) which tracks how frequent symptom categories 820 are judged to be an actual defect 830.

Still further, the defect category 830 is associated with the action category 830. In this way, the database can track or observe 835 the relationship of defect categories 830 to action categories 840. Such observations 835 are quite helpful in building the knowledge base 505 as it permits analysis of just what actions categories 840 were used to address the various defects in the defect category 830 data item. The observation 835 of the relation between the defect category 830 and action category 840 is also used to generate a frequency 837 data item (defect/action frequency data entity) which tracks how frequent particular actions in the action categories 820 are used to fix defects in the defect categories 830.

Higher level observations relating several data items may also be implemented in the DMS database 500. For example, the DMS database 500 may observe 850 the relationship between the process 810, symptom category 820 and defect category 830. The observation 850 may be used to generate a frequency 855 data item (process/symptom/defect frequency data entity). Another example is also shown in FIG. 4 in which the DMS database 500 may observe 860 the relationship between the process 810, symptom category 820, defect category 830 and action category 840. This observation 860 may be used to generate a frequency 865 data item (process/symptom/defect/action frequency data entity).

The frequency 817, 827, 837, 855, 865 data items also form part of the knowledge base 505.

Figure 5:
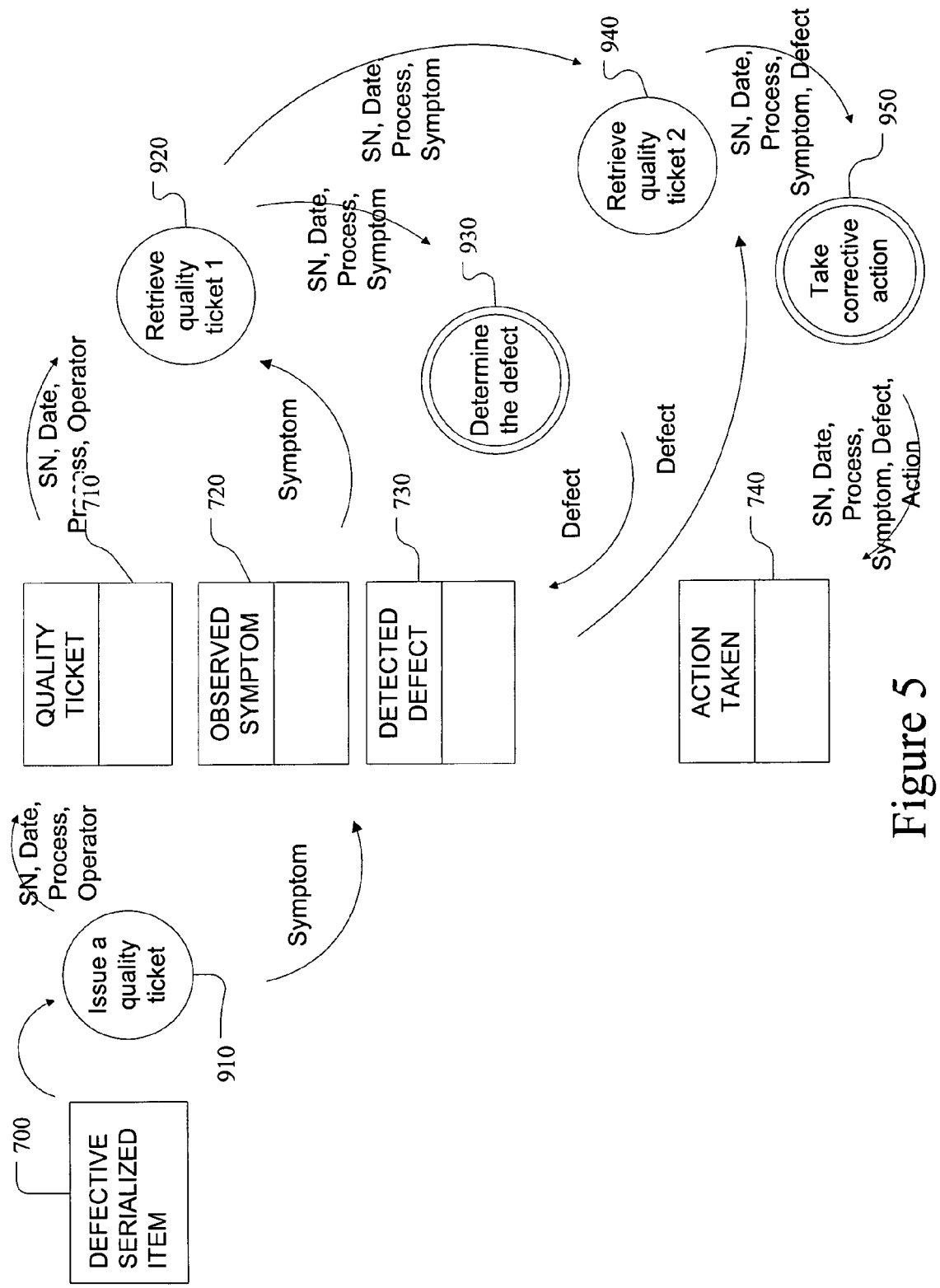
FIG. 5 is a high level flowchart illustrating defect management dataflow according to the invention.

FIG. 5 illustrates the defect management system dataflow. Specifically, the data flow begins with a defective serialized item 700 for which a quality ticket 710 is issued 910. The act of issuing 910 spawns the quality ticket 710 itself. Data flowing to the quality ticket 710 in DMS database 500 may include, as further illustrated in FIG. 5, the serial number of the defective item, the date, process, and operator. The quality ticket 710 may be issued 910 when a symptom is observed. The symptom data flows into the observed symptom 720 data item.

The troubleshooter retrieves 920 a quality ticket 710 which triggers the quality ticket 710 data and symptom data to flow from the DMS database 500 to the troubleshooter workstation 530. The defect is may then be determined 930 and defect information uploaded to the detected defect 730 data item in DMS database 500.

The reworker retrieves 940 a quality ticket 710 thereby triggering a data flow (e.g. the serial number, date, process, symptom and defect). Although the data flow is shown from quality ticket 1 to quality ticket 2 it is preferable to use DMS database 500 as the repository and retrieve this data from DMS database 500 via network 510. Based on the retrieved data, the reworker takes correction action 950 and logs the repair actions to the action taken 740 data item in DMS database 500.

Figure 6A:
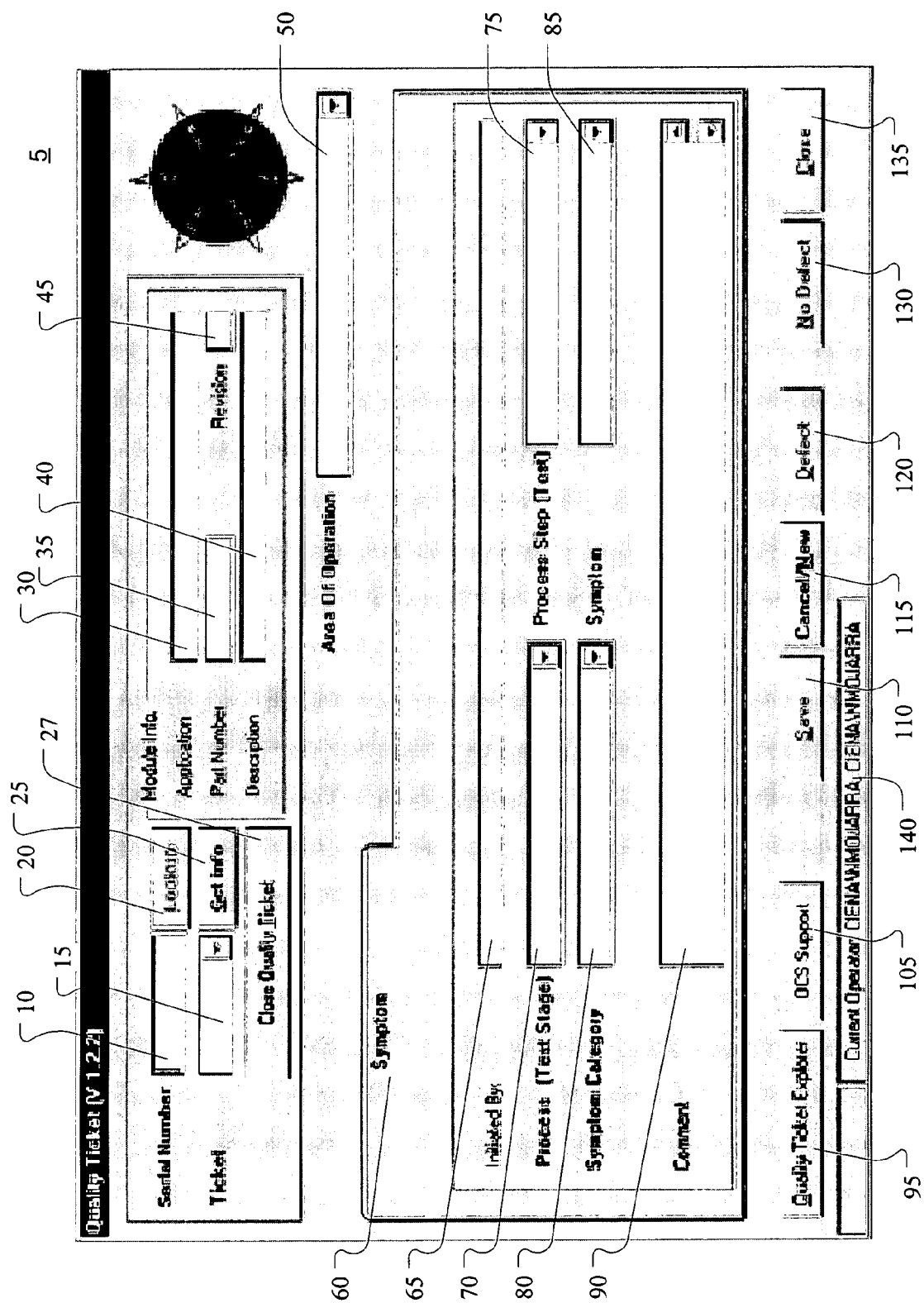
FIG. 6a is a graphical user interface according to the invention that is intended for an assembly operator working in a manufacturing plant to log symptoms for associated modules.

FIG. 6a illustrates an exemplary quality ticket screen display that provides a quite useful and convenient graphical user interface (GUI) 5 for the DMS operator. The operator GUI 5 includes a Serial Number area 10, ticket number area 15; lookup button 20, get info button 25, and close quality ticket button 27. These areas and buttons may be used as follows: An operator may enter the module serial number in Serial Number area 10 (e.g. manually or by using a bar code reader reading a bar code label attached to the module) and click the lookup button 20 which accesses the DMS database 500 and returns module information that is used to populate the Module Info text boxes including the application area 30, part number area 35, description area 40 and revision area 45.

The operator may also select the appropriate manufacturing line in the Area of Operation area 50. This area 50 is entirely optional as is some of the Module Info areas which may not apply to the particular module (e.g. if there is no revision or if there is only one application (e.g. no reworking of modules)).

More significantly and as further shown in FIG. 6a, a Symptom Tab 60 is included for the operator to rapidly and accurately communicate any defect symptoms that are detected. The detection of symptoms may be done by the operator using human senses or by aiding those senses with test equipment.

Entering symptoms using the GUI of FIG. 6a may be accomplished as follows. The operator may select the Process (Test Stage) 70 which is particularly relevant when the manufacturing/assembly involves multiple processes or test stages. A combo box is used for Process (Test Stage) 70 which permits an operator to select a process or test stage from a predefined list. Such combo boxes with predefined list choices aids in rapid communication as well as reducing communication errors.

After entering the Process (Test Stage) 70 the operator may select the Process Step (Test) 75 which is particularly relevant when the Process (Test Stage) 70 includes multiple Process Steps (Tests). Again, this selection is preferably made from a predefined list of Process Steps (Test) using a combo box. The predefined lists may be stored in the DMS database 500 and retrieved by the operator workstation via the network 510. Selection of the Process (Test Stage) may define or otherwise narrow the choices available in the Process Steps (Test).

The Process and Process Steps encompass a wide variety of manufacturing processes including automated, semi-automated, and manual manufacturing processes. Furthermore, the term "manufacturing process" encompasses not only processes for assembling or producing a module but also other processes related to manufacturing such as inspecting, testing, and repairing. Each of theses Processes may include one or more steps which are referred to herein as a Process Step.

A symptom category 80 may also be selected by the operator. The symptom categories 80 may also be defined or otherwise narrowed by the previous selection of the Process (Test Stage) 70 and/or Process Steps (Tests) 75. Once a symptom category 80 is selected, the operator may select the symptom 85. The symptoms available in symptom area 85 may also be defined or otherwise narrowed by the previous selection of the symptom category 80, Process (Test Stage) 70 and/or Process Steps (Tests) 75.

The operator may also type in a comment in the comment field 90. This permits an operator to provide additional information such as details of the symptom not indicated by the symptom category 80 or symptom 85.

FIG. 6a also illustrates a number of additional functions that may be triggered by buttons including a quality ticket explorer button 95 (see FIG. 8 and explanation below) and an OCS support button 105.

The OCS support button 105 provides the user of the system with a URL (link) to a web site where they can find the information on how to contact support staff in the case of any manufacturing issue (including issues with the software.) Furthermore, the web site may provide the users with links to the documentation (administration guides, user guides, and troubleshooting guides) for OCS applications (including DMS.)

FIG. 6a further illustrates a save (quality ticket) 110 button, cancel/new button 115 (to generate more than one quality ticket 710 related to the module), defect button 120 (for the troubleshooter, reworker or inspector to enter defect information as explained below), No Defect button 130 (for the troubleshooter, reworker or inspector to indicate that no defect is in fact detected), and close button 135 (close this quality ticket 710).

The GUI 5 may also include an identification area 140 to identify the current operator as further shown in FIG. 6.

Figure 6B:
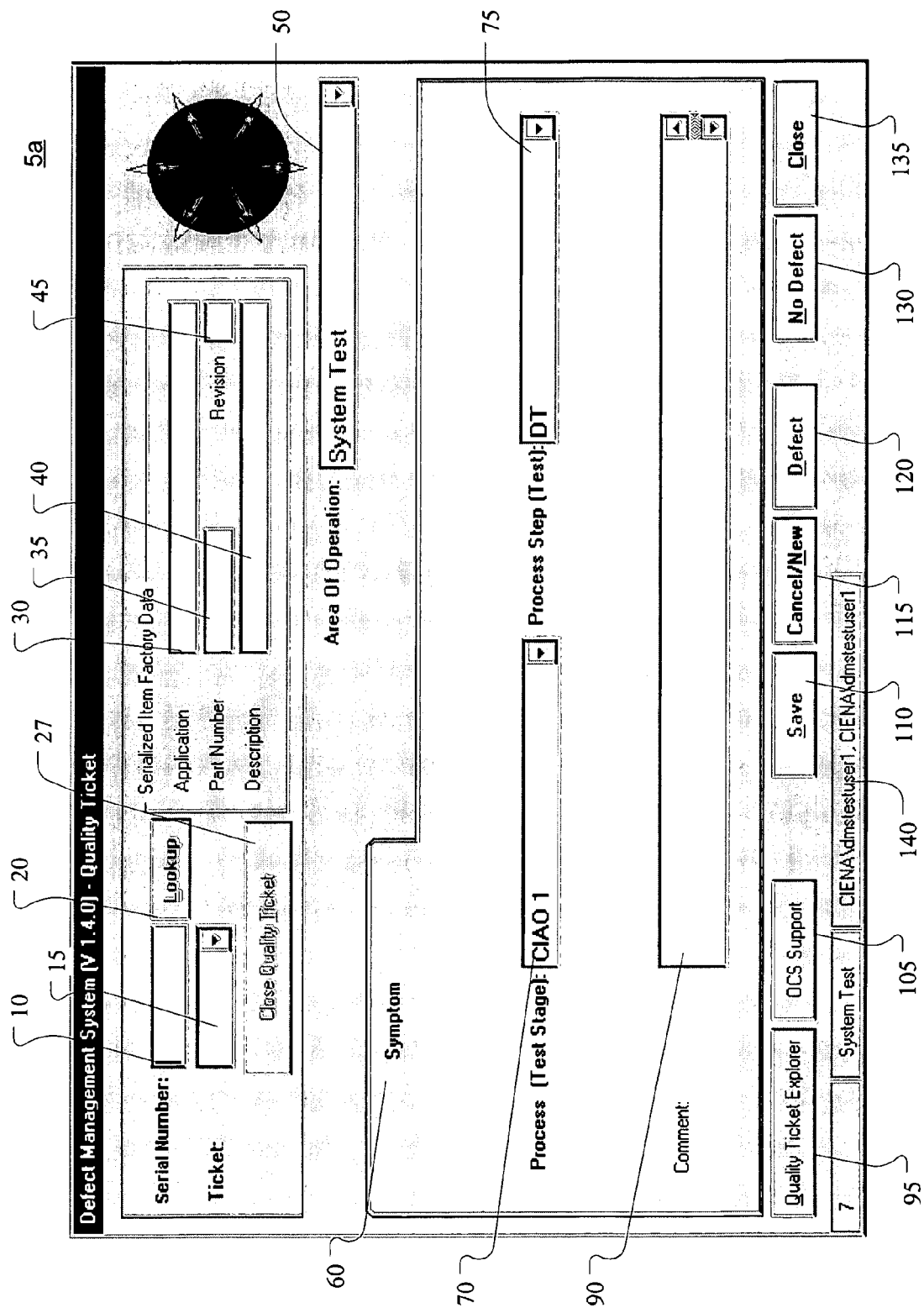
FIG. 6b is an alternative graphical user interface according to the invention that is intended for an assembly operator working in a manufacturing plant to log symptoms for associated modules.

FIG. 6b is an alternative GUI 5a that shares many of the same functions as GUI 5. More specifically GUI 5a is a simplified version of GUI 5 and eliminates the symptom category 80 and symptom 85 areas in favor of the comment area 90. In other words, it may be more efficient to identify the process 70 & process step 75 and enter the detected symptom in the comment area 90.

FIG. 6b also highlights the adaptability and breadth of the invention to situations where tracking both the symptom 70 and symptom category 75 would be a wasteful allocation of resources. In other words, the combination of symptom 70 and symptom category 75 is optional and the symptom may be entered simply by typing in the comment area 90. This may be useful where the symptoms and symptom categories are difficult or too limiting to predefine with the combo boxes such that simply typing in the symptom in the comment area 90 is most efficient.

Figure 7:
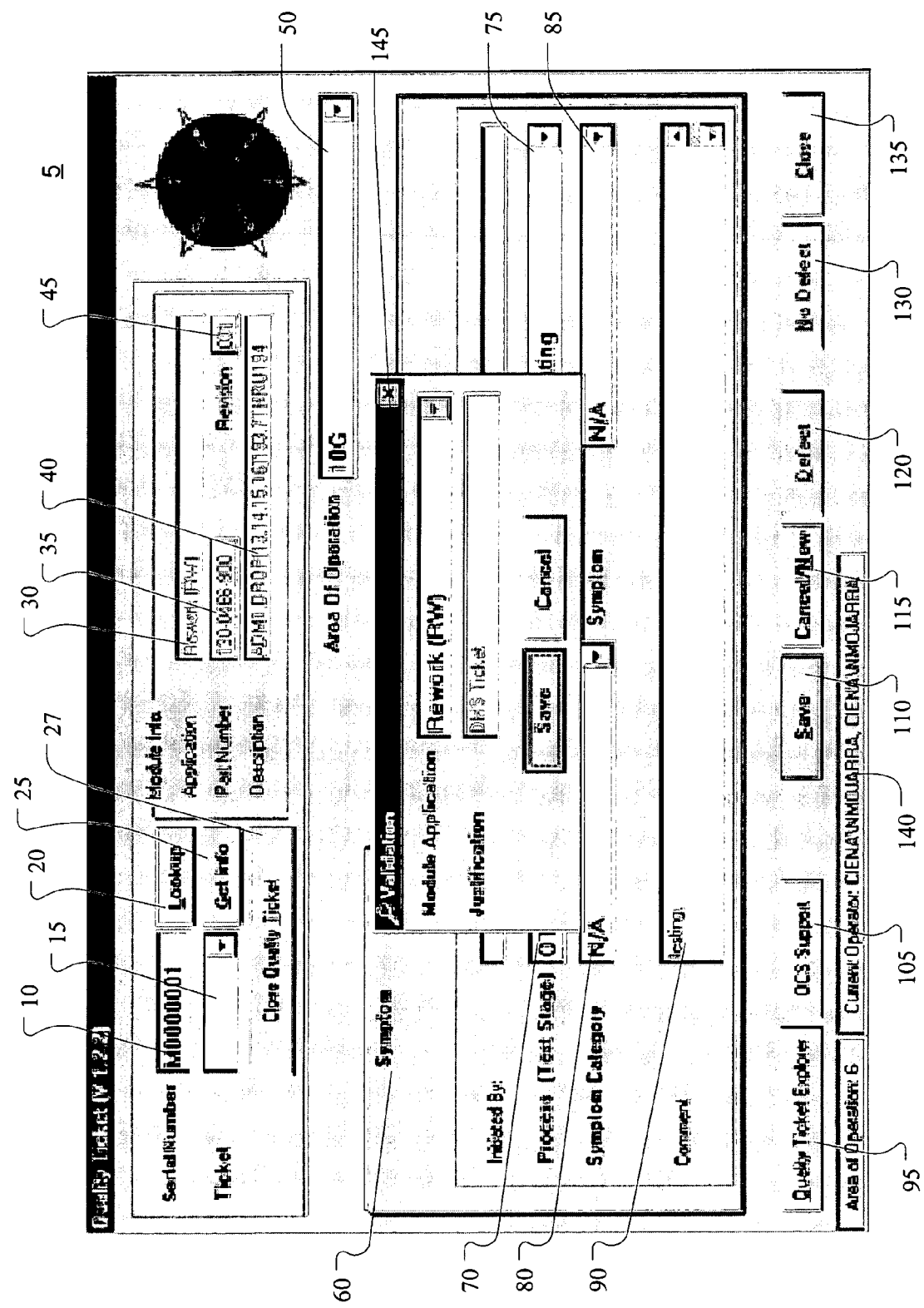
FIG. 7 illustrates other aspects of the FIG. 6a graphical user interface according to the invention.

FIG. 7 illustrates additional aspects of the operator GUI 5. For example, FIG. 7 shows some actual data such as serial number and module info. FIG. 7 also illustrates the Validation window 145 which is triggered upon the actuation of the Save button 110 and provides the user with the ability to change the module's application (e.g. from rework to inspect) before saving to the DMS database 500.

Figure 8:
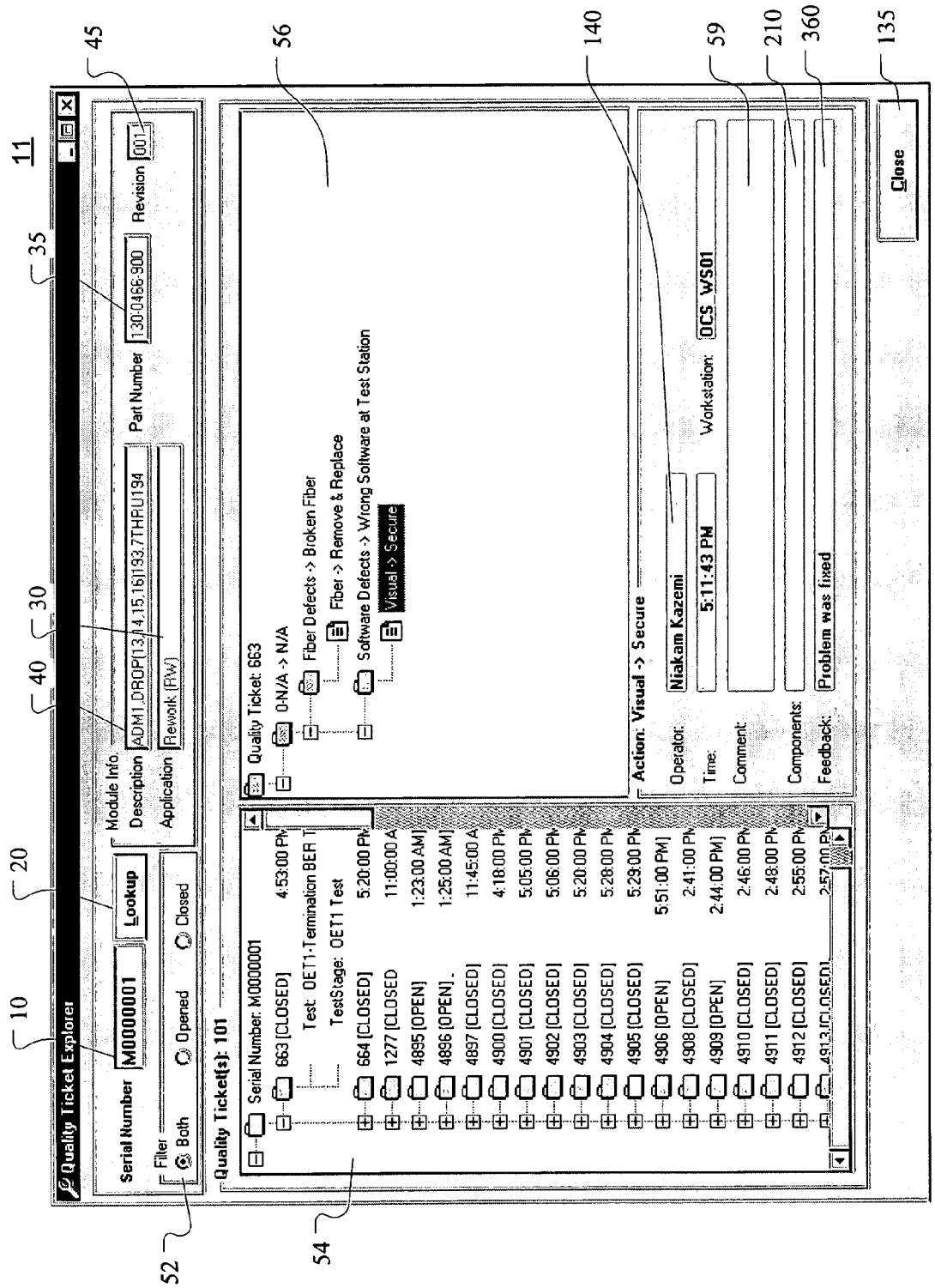
FIG. 8 is a graphical user interface according to the invention that showing a quality ticket explorer function.

FIG. 8 illustrates the Quality ticket 710 explorer GUI 11 which is triggered upon actuation of the Quality ticket 710 explorer button 27. This GUI 11 permits a user to lookup a specific module serial number and explore it for related information. For example, a user may want to view quality tickets 710 for similar defects and see affected components, comments, and feedback. Components of the GUI 11 include many of the same areas and buttons as previously explained GUIs whose description will not be repeated. In addition, GUI 11 has a filter 52 that can filter Quality tickets 710 displayed in file explorer area 54. Window 56 shows details of the file selected in the file explorer area 54. A comment 59 may also be viewed or edited for the selected file.

Figure 9:
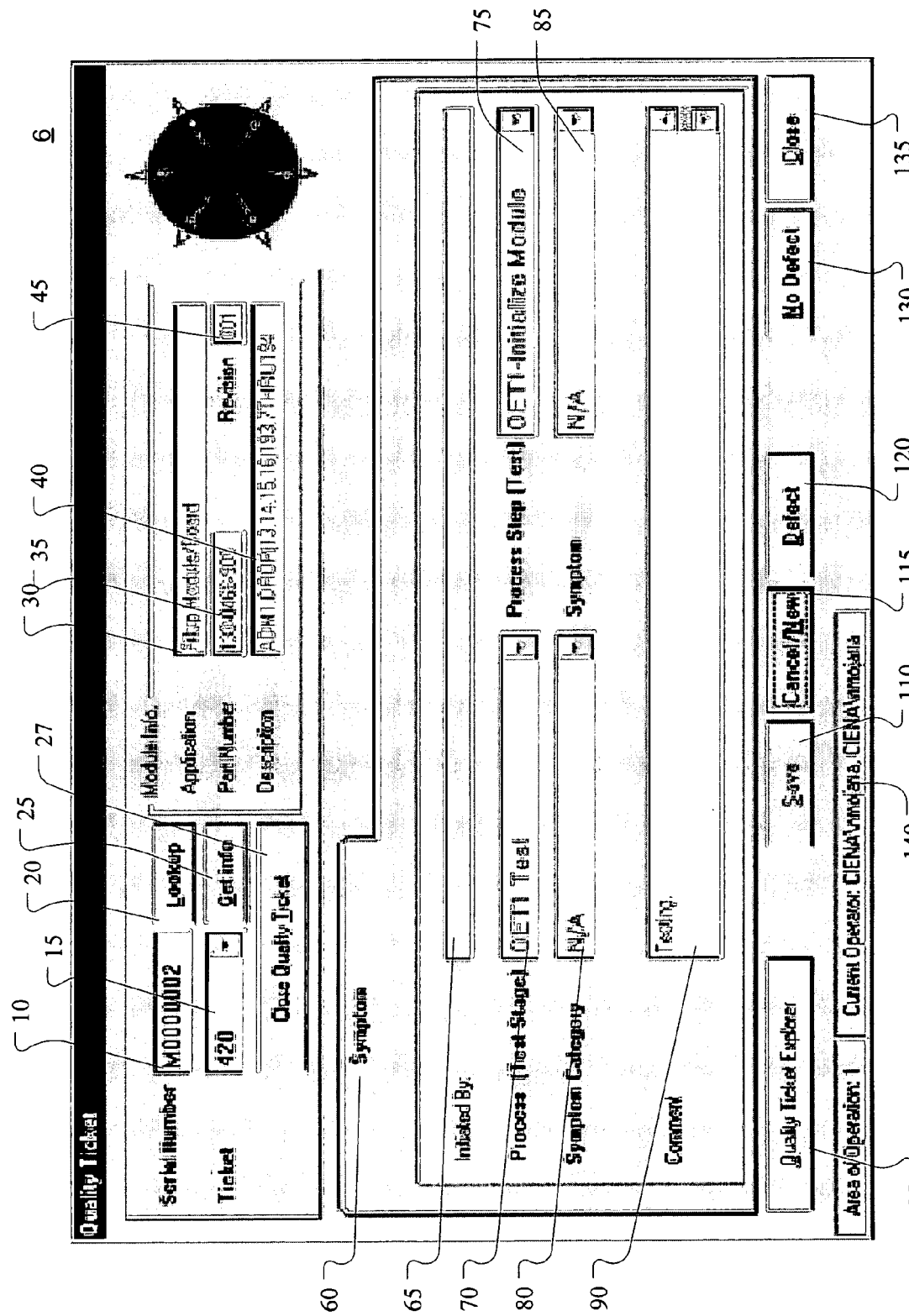
FIG. 9 is a graphical user interface according to the invention that is intended for a troubleshooter working in a manufacturing plant to view logged symptoms for associated modules.

FIG. 9 illustrates an exemplary quality ticket screen display 6 that provides a quite useful and convenient graphical user interface (GUI) 6 for the DMS troubleshooter. The troubleshooter GUI 6 is very similar to the operator GUI 5 particularly at the stage shown in FIG. 9 which is at the stage when the troubleshooter retrieves the quality ticket 710 from DMS database 500. As can be seen in FIG. 9, the troubleshooter has a plethora of information available to him/her to help in the diagnosis of the defect. If a defect is detected then the troubleshooter may press the defect button 120. If no defect is detected, the No Defect button 130 may be used.

Figure 10A:
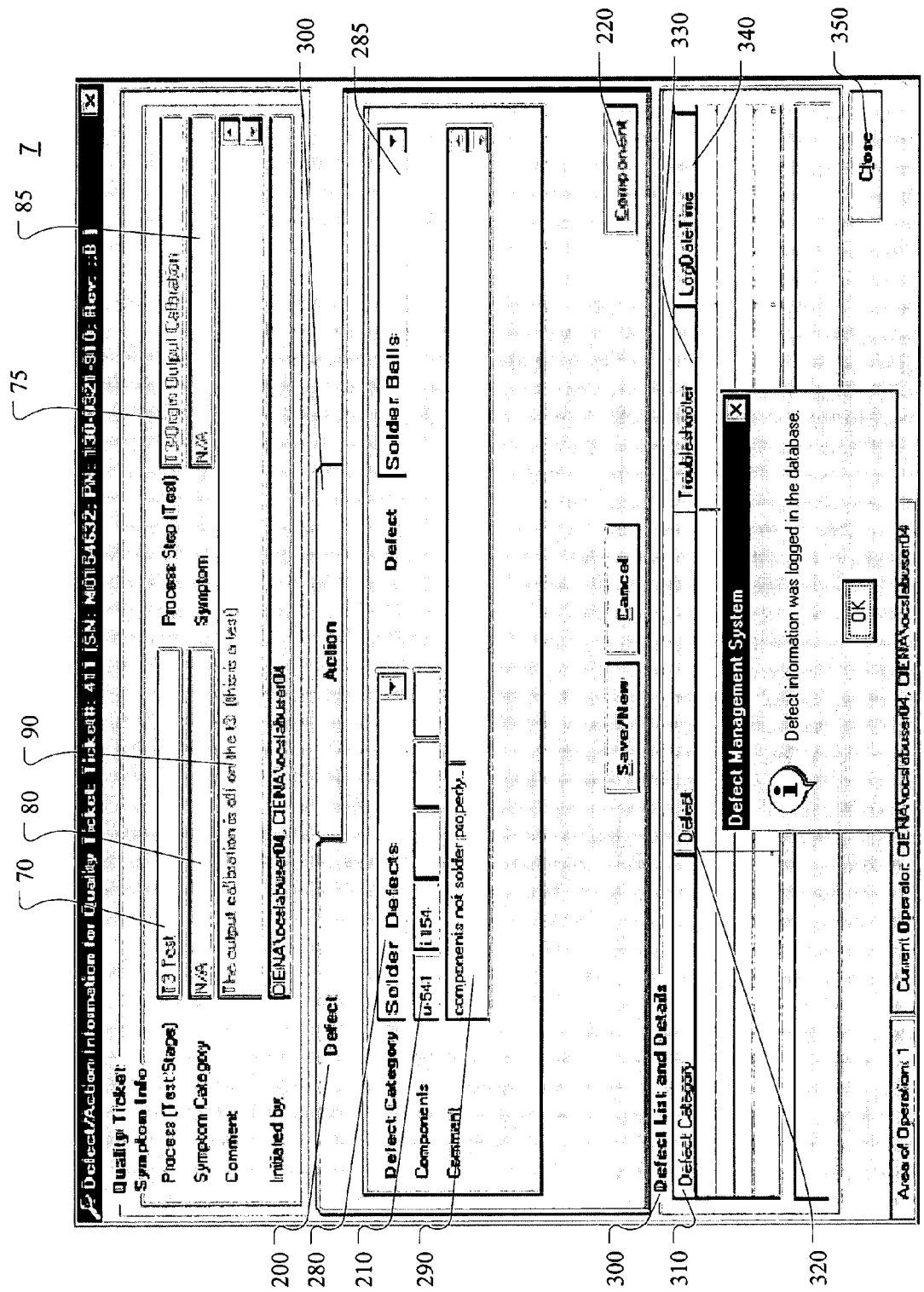
FIG. 10a is a graphical user interface according to the invention that is intended for a troubleshooter working in a manufacturing plant to log defects for associated modules.
Figure 10B:
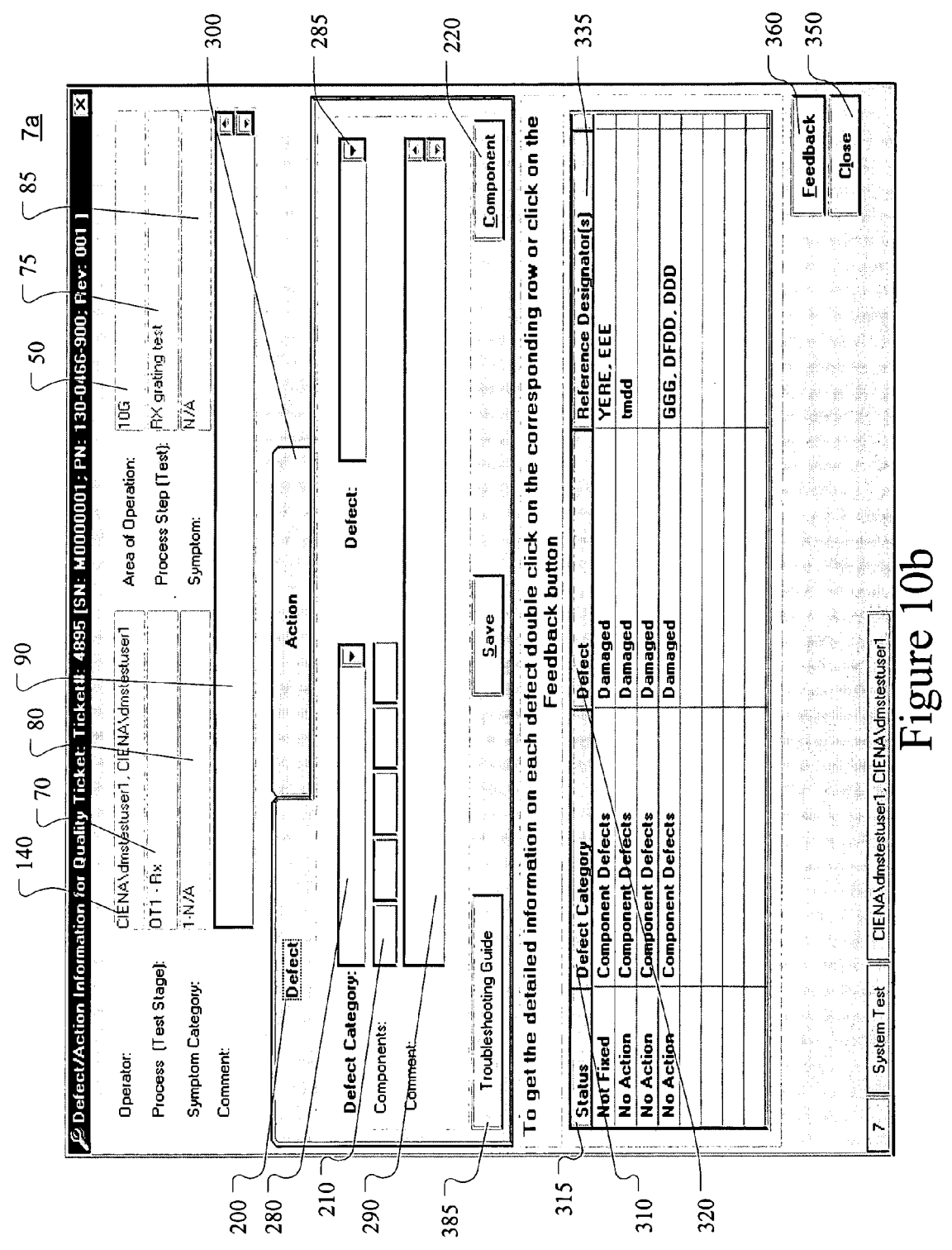

Actuating the defect button 120 triggers the defect tab 200 and action tab 300 to be displayed as shown in FIG. 10a and 10b.

As further shown in FIG. 10a, the defect tab 200 of GUI 7 permits the troubleshooter to log defect information by using the defect category area 210, defect area 285, and components area 210. The components area 210 may include a plurality of fields as shown which permit the troubleshooter to identify particular components affected by the defect. The defect tab 200 may also include a comments field 290 so that the troubleshooter may log detailed comments to the DMS database 500 for future reference and use. The comment field 90 filled in by the operator is also repeated in the troubleshooter GUI 7 to permit the troubleshooter to view any comments made by the operator.

FIG. 10b is an alternative GUI 7a that shares many of the same functions as GUI 7 shown in FIG. 10a. More specifically GUI 7a is an enhanced version of GUI 7 and provides a troubleshooting guide button 385 that taps into the knowledge base 505 and triggers display of the troubleshooting guide 386.

An example of the troubleshooting guide 386 is shown in FIG. 15. As shown therein, the troubleshooting guide 386 displays a list of the most likely causes for the specified symptom. The symptom specification may be taken from the symptom category 80 or symptom 80 that has already been entered into the DMS database 500 through the various GUIs. The troubleshooting guide 386 operates by tapping into the knowledge base 505. A range of configurations are available as described above.

FIG. 15 shows one such configuration of the troubleshooting guide 386 that includes columns for the defect category 387, defect 388 and frequency 389. For the example shown in FIG. 15, the most likely cause for the specified symptom is a defective component with a test error running a close second on frequency of occurrence. Other possibilities and their relative frequencies 389 are also shown to aid the troubleshooter.

After utilizing the troubleshooting guide 386, the troubleshooter may then log in the defect information in the defect tab 200. While using the troubleshooting guide is preferable it is not required as generally indicated by the use of troubleshooting guide button 385. Closing the troubleshooting guide 386 returns the user to the GUI 7a shown in FIG. 10b.

Figure 14:
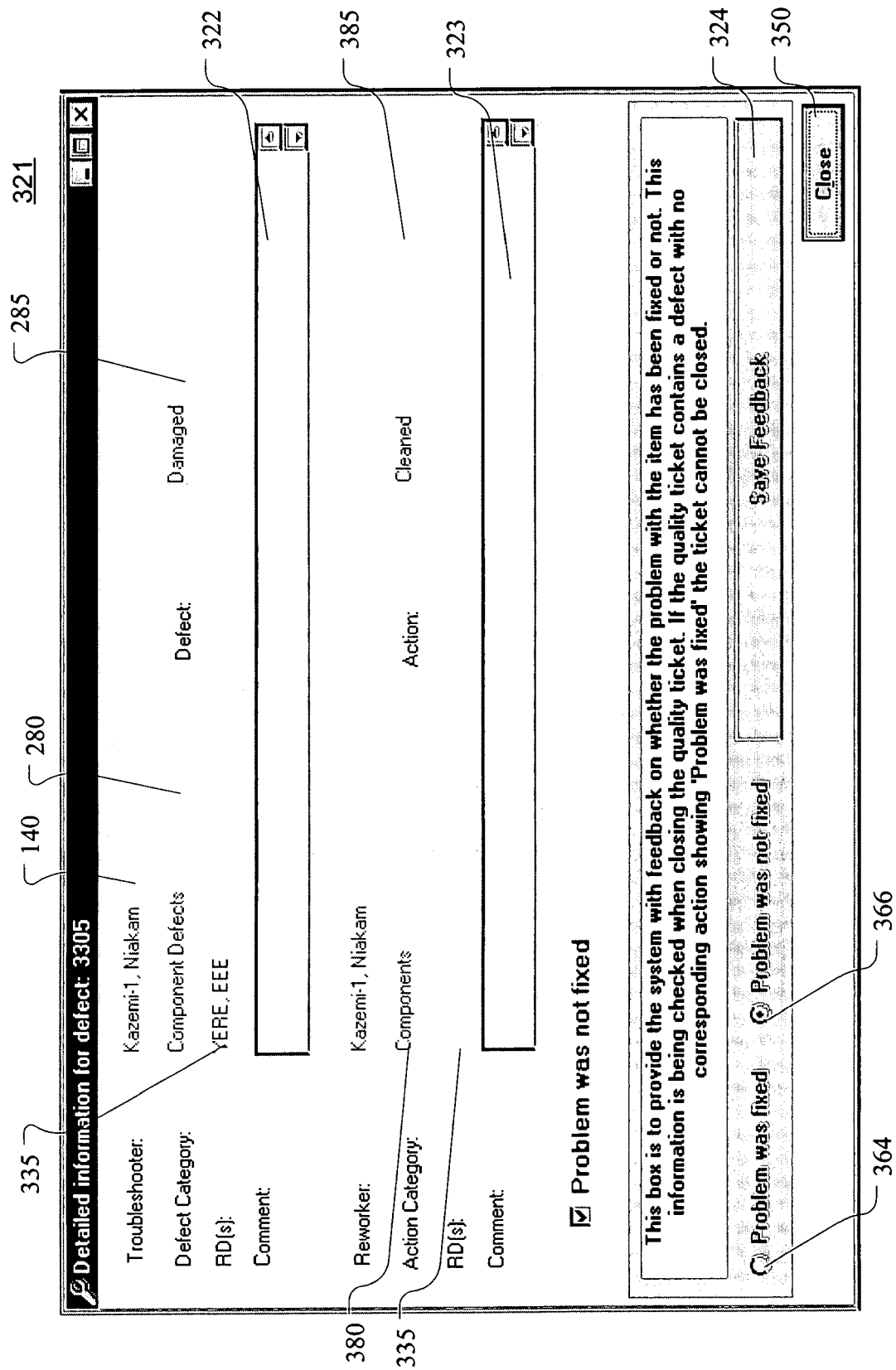
FIG. 14 is a graphical user interface according to the invention that permits an operator to view detailed defect information and to provide feedback.

As further shown in FIG. 10b, the operator may also view a list of defect information for the current module including information such as the status 315 (fixed, not fixed), defect category 310, defect 320 and reference designator(s) 335. Double clicking a row of this list or highlighting a row and clicking the feedback button 360 provides more detailed information to the user about that particular defect. FIG. 14 is an example of a detailed information display and GUI 321. As shown therein, the troubleshooter information and reworker information may be displayed to show details for the selected defect. Feedback may also be provided including a comment field 322 for the troubleshooter and a comment filed 323 for the reworker. This GUI 321 may also be used to provide feedback in the form of fixed/not fixed buttons 364/366. This feedback information may be saved to the DMS database 500 using the save feedback button 324. Closing with the close button 350 returns the user to the GUI 7a shown in FIG. 10b.

Figure 11A:
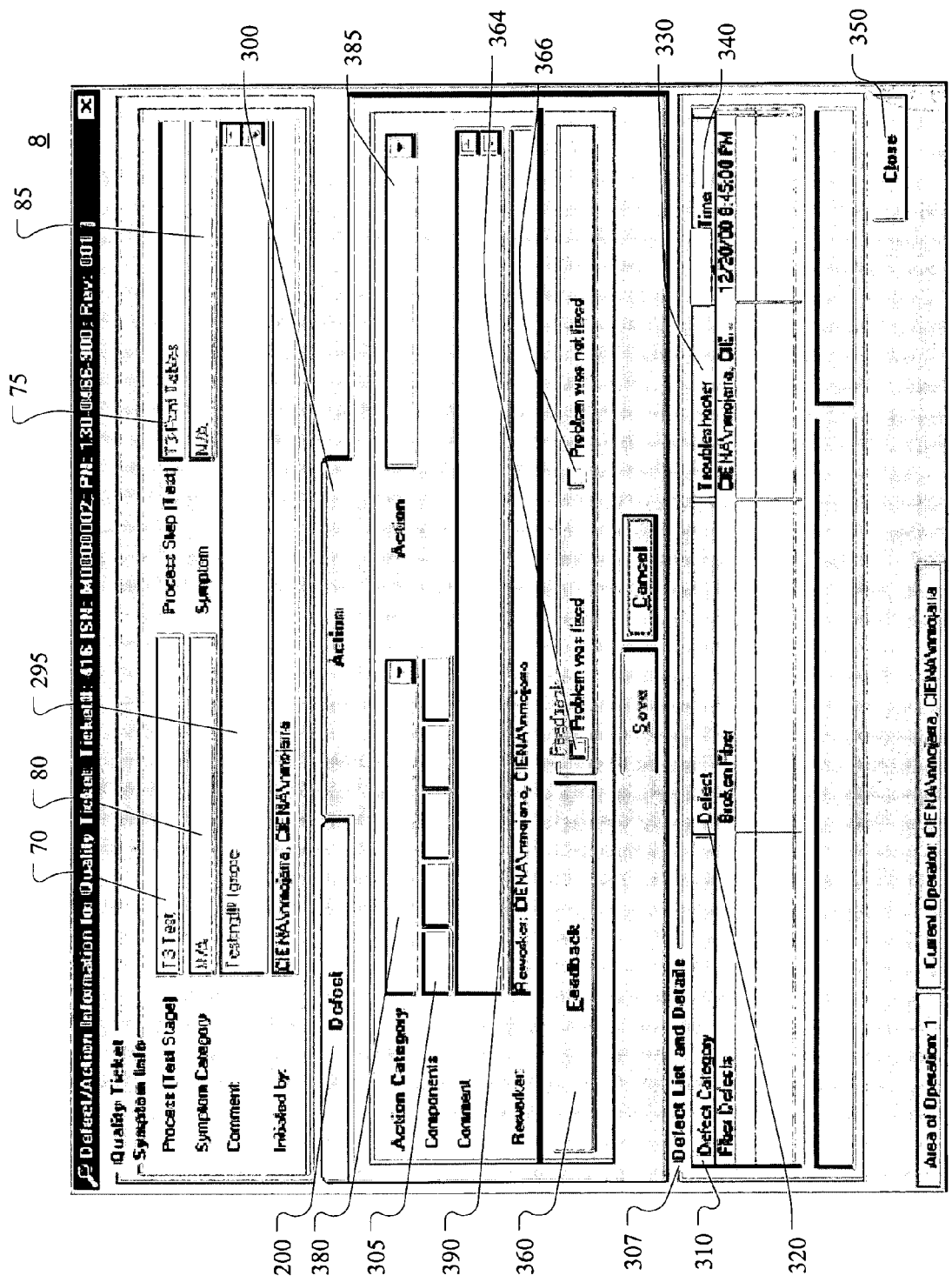
FIG. 11a is a graphical user interface according to the invention that is intended for a reworker working in a manufacturing plant to view logged symptoms and defects as well as log corrective actions taken for associated modules.

FIG. 11a illustrates an exemplary quality ticket screen display that provides a quite useful and convenient graphical user interface (GUI) 8 for the DMS reworker. As can be seen in FIG. 11a, the reworker has a plethora of information available to him/her to help remedy the defect. In addition to the ability to press the defect tab 200 and see all the information contained therein, the comment field 295 shows the comments made by the operator and troubleshooter. Furthermore, a defect list 307 is presented which shows a list of defects and details including a column 310 for defect category, a column 320 for defects, a column 330 identifying the troubleshooter, and a column 340 for the log date/time at which the troubleshooter logged the defect information.

The action tab 300 in FIG. 11a permits the reworker to log in the repair actions taken by using the action category area 380, actions area 385, and components area 305. The reworker may also log comments into the reworker comment field 390. In addition, feedback may also be provided using the feedback button 360, problem was fixed box 364, and problem was not fixed box 366. This feedback is primarily intended for the inspector.

Figure 11B:
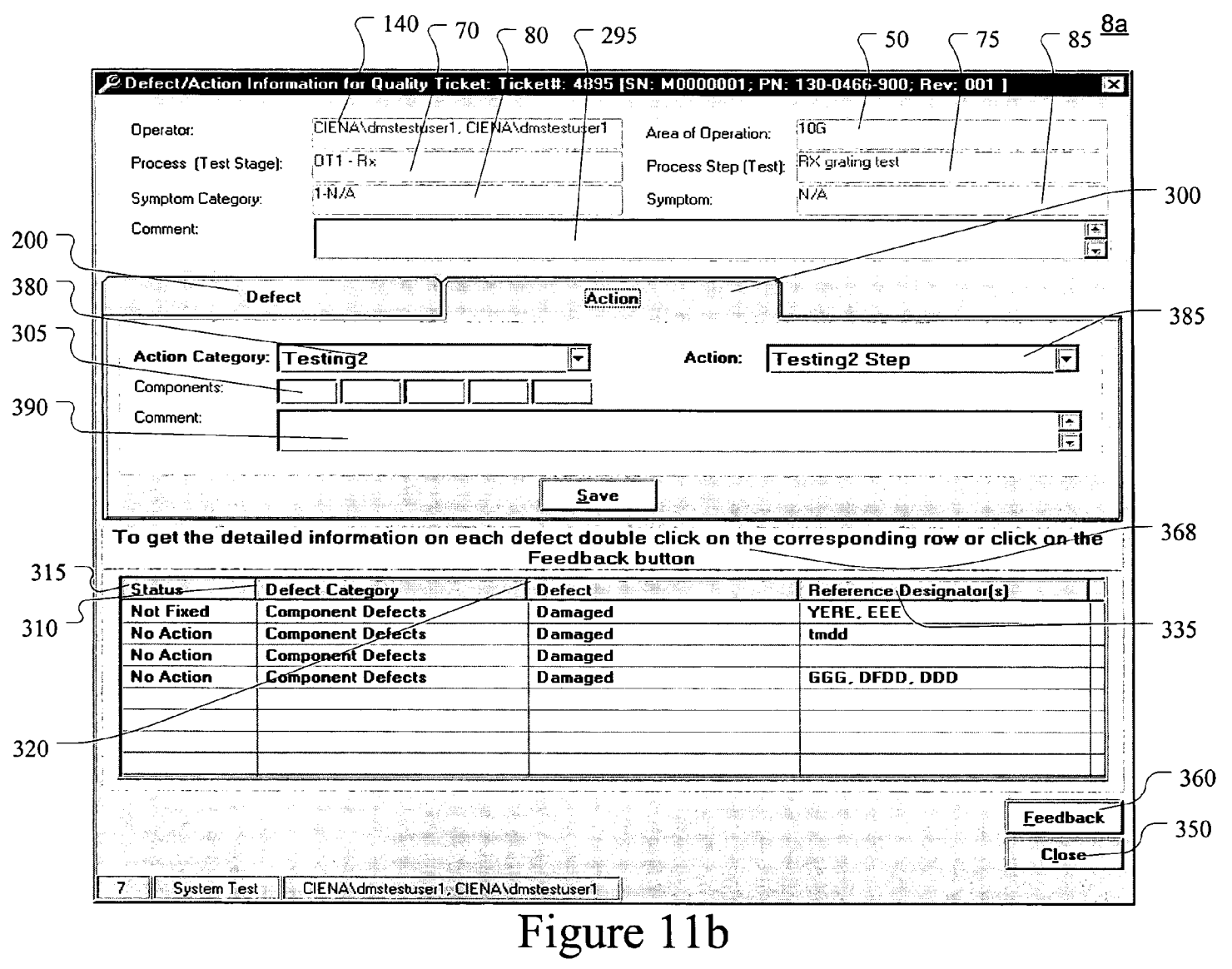

FIG. 11b is an alternative GUI 8a that shares many of the same functions as GUI 8. The main difference is the bottom section of the GUI which has a modified list of defects that includes a status column 315 much like the list shown in the GUI 7a of FIG. 10b. This list and the retrieval of more detailed defect information functions the same as the list shown in FIG. 10b and described above. Therefore, this description will not be repeated here.

Figure 12:
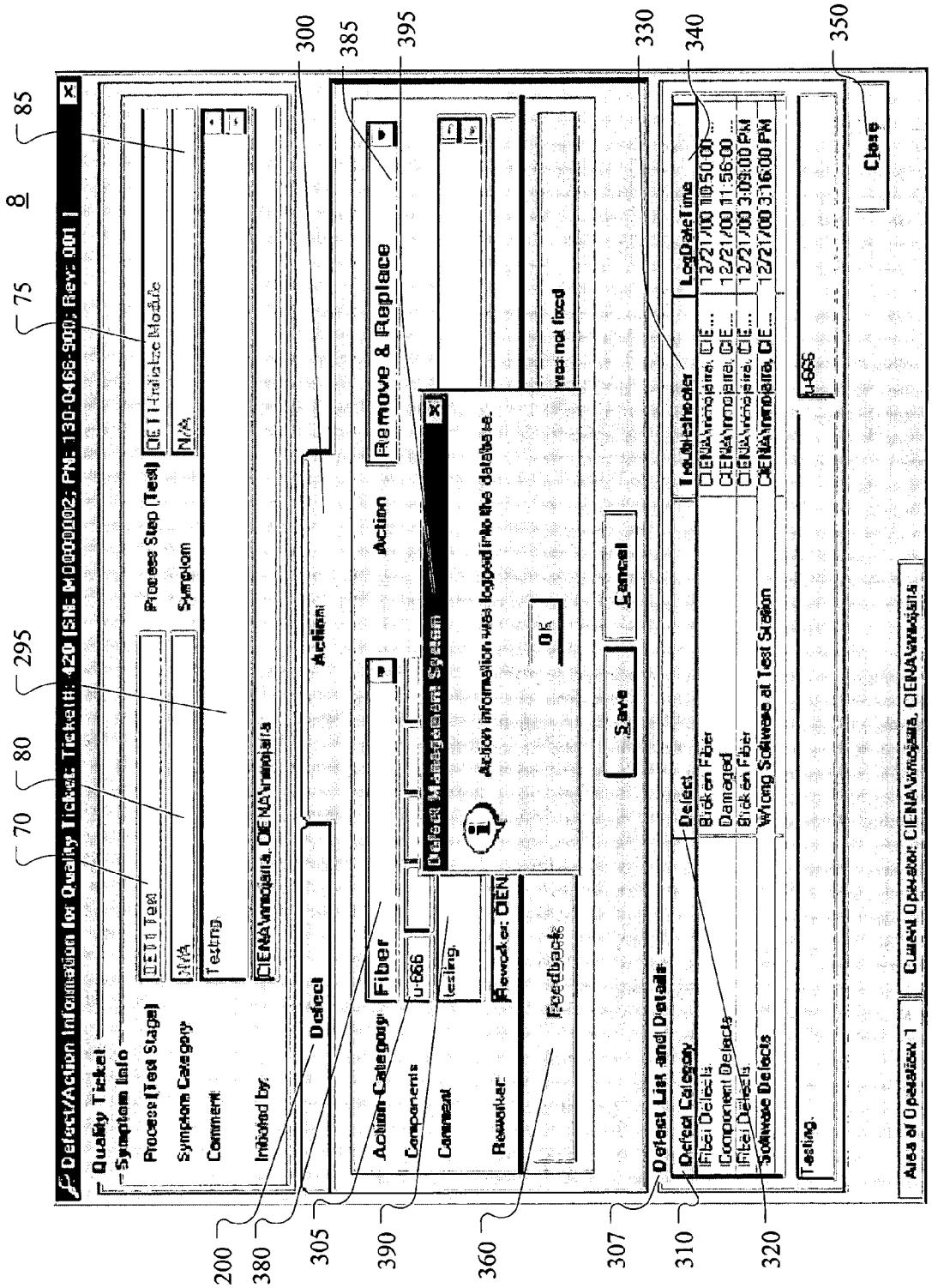
FIG. 12 illustrates other aspects of the FIG. 11a graphical user interface according to the invention.

FIG. 12 illustrates additional aspects of the reworker GUI 8. For example, FIG. 12 shows some actual data such a populated defect list and action tab 300. FIG. 12 also illustrates the confirmation window 395 confirming that the action information has been successfully logged to the DMS database 500.

Figure 13:
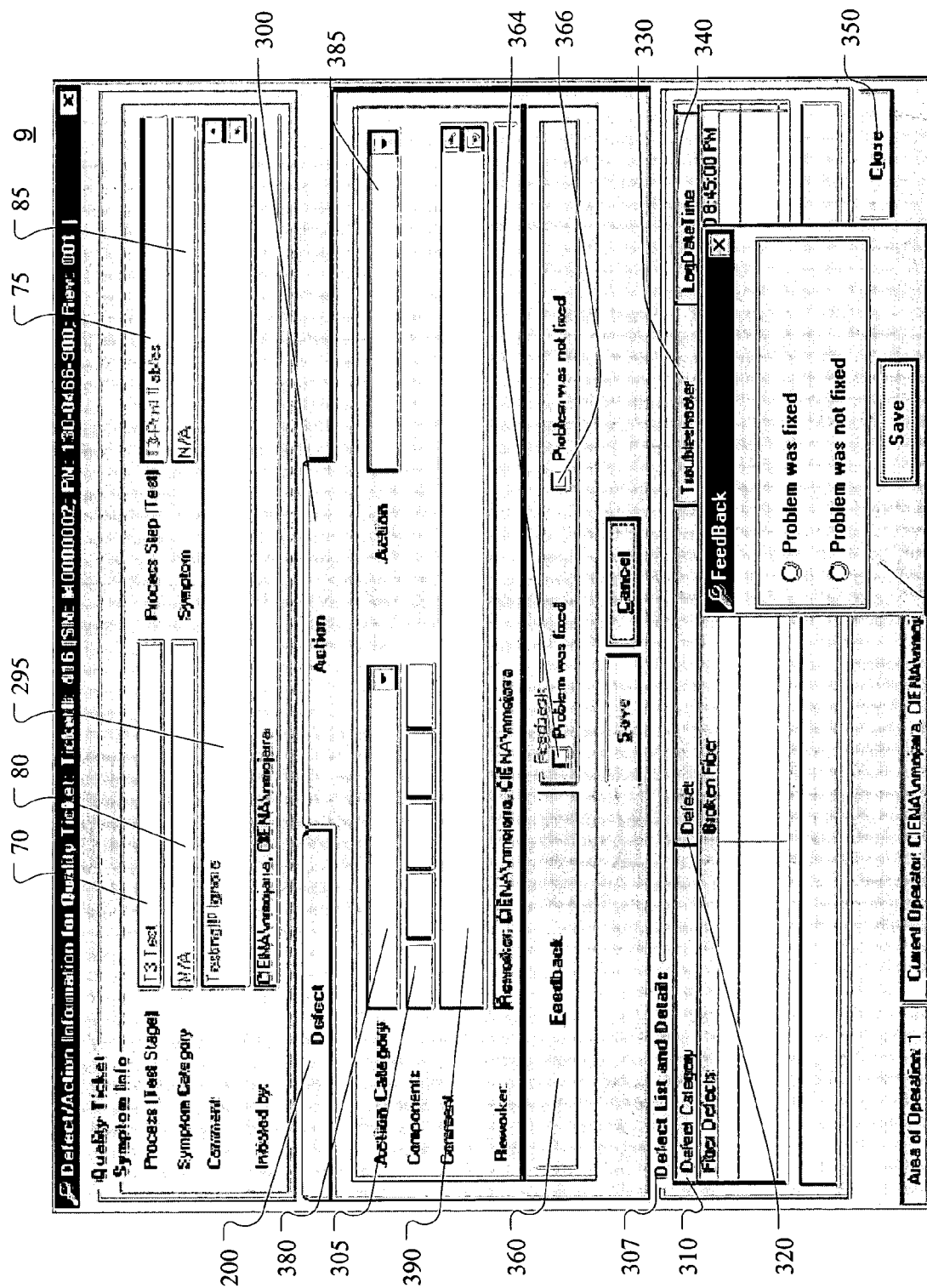
FIG. 13 is a graphical user interface according to the invention that is intended for an inspector working in a manufacturing plant to view logged actions and defects and provide feedback for associated modules.

FIG. 13 illustrates an exemplary quality ticket screen display that provides a quite useful and convenient graphical user interface (GUI) for the DMS inspector. The inspector GUI 9 is very similar to the reworker GUI 8. The main interaction between the inspector and the inspector GUI 9 is the feedback button 360. Based on the results of the inspection, feedback may also be provided using the feedback button 360, problem was fixed box 364, and problem was not fixed box 366. A separate popup window 397 may also be used to provide feedback as further shown in FIG. 13.

The invention being thus described, it will be obvious that the same may be varied in many ways. Such variations are not to be regarded as departure from the spirit and scope of the invention, and all such modifications as would be obvious to one skilled in the art are intended to be included within the scope of the following claims.

What is claimed is:

1. A computer-implemented manufacturing quality information database for tracking quality information relating to a manufacturing process, comprising;

a symptom data entity storing symptoms, which are observable states indicative of manufacturing process defects;

a defect data entity storing defects of the manufacturing process;

a defect category data entity for storing defect categories of the manufacturing process;

said defect data entity being associated with said defect category data entity;

an action data entity storing repair actions for remedying related defects;

said defect data entity being associated with said symptom data entity; and said action data entity being associated with said defect data entity wherein said manufacturing quality information database tracks a plurality of manufacturing processes, the manufacturing quality information database further comprising:

a process data entity storing identities of the manufacturing processes;

a symptom category data entity storing symptom categories of manufacturing defects;

observing a relationship frequency among the manufacturing process identities, the symptom categories and the defect categories; and storing the relationship frequency in a process/symptom/defect frequency data entity.

2. The computer-implemented manufacturing quality information database according to claim 1, wherein said manufacturing quality information database tracks a plurality of manufacturing processes, the manufacturing quality information database further comprising:

a process data entity storing identities of the manufacturing processes, said symptom data entity, said defect data entity, and said action data entity being associated with said process data entity.

3. The computer-implemented manufacturing quality information database according to claim 1, wherein said manufacturing quality information database tracks a plurality of manufactured items, the manufacturing quality information database further comprising:

an item data entity storing identities of manufactured items;

said symptom data entity, said defect data entity, and said action data entity being associated with said item data entity.

4. The computer-implemented manufacturing quality information database according to claim 1, said symptom data entity being associated with said symptom category data entity.

5. The computer-implemented manufacturing quality information database according to claim 4, the manufacturing quality information database further comprising:

a process/symptom frequency data entity observing a relationship frequency between the symptom categories and the manufacturing process identities.

6. The computer-implemented manufacturing quality information database according to claim 1, further comprising:

a symptom/defect frequency data entity observing a relationship frequency between the symptom categories and the defect categories.

7. The computer-implemented manufacturing quality information database according to claim 1, further comprising:

an action category data entity storing action categories;

said action data entity being associated with said action category data entity.

8. The computer-implemented manufacturing quality information database according to claim 7, further comprising:

a defect/action frequency data entity observing a relationship frequency between the defect categories and the action categories.

9. The computer-implemented manufacturing quality information database according to claim 1, said symptom data entity being associated with said symptom category data entity; and said defect category entity being associated with said symptom category data entity.

10. The computer-implemented manufacturing quality information database according to claim 1, further comprising:

an action category data entity storing action categories;

said action data entity being associated with said action category data entity; and said action category data entity being associated with said defect category data entity.

11. A computer-implemented manufacturing quality information database for tracking quality information relating to a manufacturing process, comprising:

a symptom data entity storing symptoms, which are observable states indicative of manufacturing process defects;

a defect data entity storing defects of the manufacturing process;

a defect category data entity for storing defect categories of the manufacturing process;

said defect data entity being associated with said defect category data entity;

an action data entity storing repair actions for remedying related defects;

said defect data entity being associated with said symptom data entity; and said action data entity being associated with said defect data entity, wherein said manufacturing quality information database tracks a plurality of manufacturing processes, the manufacturing quality information database further comprising:

a process data entity storing identities of the manufacturing processes;

a symptom category data entity storing symptom categories of manufacturing defects;

an action category data entity storing action categories;

observing a relationship frequency among the manufacturing process identities, the symptom categories, the defect categories, and the action categories; and storing the relationship frequency in a process/symptom/defect/action frequency data entity.

12. A computer-implemented method of using a manufacturing quality information database for tracking quality information relating to a manufacturing process, comprising:

storing symptoms, which are observable states indicative of manufacturing process defects in a symptom data entity;

storing defects of the manufacturing process in a defect data entity;

storing defect categories of the manufacturing process in a defect category data entity;

associating the defect data entity being with the defect category data entity;

storing repair actions for remedying related defects in an action data entity;

associating the defect data entity with the symptom data entity;

associating the action data entity with the defect data entity;

tracking a plurality of manufacturing processes with the manufacturing quality information database, storing identities of the manufacturing processes in a process data entity, storing symptom categories of manufacturing defects in a symptom category data entity;

storing action categories in an action category data entity;

observing a relationship frequency among the manufacturing process identities, the symptom categories, the defect categories, and the action categories; and storing the relationship frequency in a process/symptom/defect/action frequency data entity.

13. The computer-implemented method of using a manufacturing quality information database according to claim 12, further comprising:

associating the symptom data entity, the defect data entity, and the action data entity with the process data entity.

14. The computer-implemented method of using a manufacturing quality information database according to claim 12, further comprising:

associating the symptom data entity, the defect data entity, and the action data entity with a item data entity.

15. The computer-implemented method of using a manufacturing quality information database according to claim 12, further comprising:

associating the symptom data entity with the symptom category data entity.

16. The computer-implemented method of using a manufacturing quality information database according to claim 15, observing a relationship frequency between the symptom categories and the manufacturing process; and storing the relationship frequency in a process/symptom frequency data entity.

17. The computer-implemented method of using a manufacturing quality information database according to claim 12, further comprising:

observing a relationship frequency between the symptom categories and the defect categories; and storing the relationship frequency in a symptom/defect frequency data entity.

18. The computer-implemented method of using manufacturing quality information database according to claim 12, further comprising:

storing action categories in an action category data entity; and associating the action data entity with the action category data entity.

19. The computer-implemented method of using a manufacturing quality information database according to claim 18, further comprising:

observing a relationship frequency between the defect categories and the action categories; and storing the relationship frequency in a defect/action frequency data entity.

20. The computer-implemented method of using manufacturing quality information database according to claim 12, further comprising:

observing a relationship frequency among the manufacturing process identities, the symptom categories and the defect categories; and storing the relationship frequency in a process/symptom/defect frequency data entity.

21. The computer-implemented method of using a manufacturing quality information database according to claim 12, further comprising:

associating the symptom data entity with the symptom category data entity; and associating the defect category entity with the symptom category data entity.

22. The computer-implemented method of using a manufacturing quality information database according to claim 12, further comprising:

storing action categories in an action category data entity;

associating the action data entity with the action category data entity; and associating the action category data entity with the defect category data entity.

* * * * *